United States Patent
Tkaczyk et al.

(10) Patent No.: US 11,783,817 B2
(45) Date of Patent: Oct. 10, 2023

(54) IDENTIFICATION OF ANOMALIES IN AIR TRAFFIC CONTROL COMMUNICATIONS

(71) Applicant: International Business Machines Corporation, Armonk, NY (US)

(72) Inventors: Gregory M. J. H. Tkaczyk, Mississauga (CA); Edward Graham Katz, Washington, DC (US); John S Quimby, West Chester, OH (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 17/333,443

(22) Filed: May 28, 2021

(65) Prior Publication Data

US 2022/0383866 A1 Dec. 1, 2022

(51) Int. Cl.
| | |
|---|---|
| *G10L 15/22* | (2006.01) |
| *G10L 15/18* | (2013.01) |
| *G10L 15/10* | (2006.01) |
| G06F 40/295 | (2020.01) |
| G06F 40/30 | (2020.01) |
| G06F 40/279 | (2020.01) |

(52) U.S. Cl.
CPC .......... *G10L 15/1822* (2013.01); *G10L 15/10* (2013.01); *G10L 15/22* (2013.01); *G06F 40/279* (2020.01); *G06F 40/295* (2020.01); *G06F 40/30* (2020.01); *G10L 15/1815* (2013.01); *G10L 2015/225* (2013.01)

(58) Field of Classification Search
None
See application file for complete search history.

(56) References Cited

U.S. PATENT DOCUMENTS

| | | | | |
|---|---|---|---|---|
| 5,652,897 | A * | 7/1997 | Linebarger | G10L 15/1822 704/4 |
| 7,580,377 | B2 * | 8/2009 | Judd | G10L 15/26 340/963 |
| 7,865,367 | B2 | 1/2011 | Carro | |
| 8,515,763 | B2 * | 8/2013 | Dong | G10L 21/0208 701/14 |
| 10,089,886 | B2 * | 10/2018 | Kawalkar | G08G 5/0013 |
| 10,116,738 | B2 | 10/2018 | Stolorz | |

(Continued)

FOREIGN PATENT DOCUMENTS

WO 2015092955 A1 6/2015

OTHER PUBLICATIONS

"[Real ATC] Inattentive Controller and Inattentive Pilots together at JFK!", YouTube, Oct. 8, 2019, 2 pages, <https://www.youtube.com/watch?v=gszTBkt4FGk&feature=youtu.be>.

(Continued)

*Primary Examiner* — Richard Z Zhu
(74) *Attorney, Agent, or Firm* — Haley J. McClory

(57) ABSTRACT

A processor may identify an anomaly in one or more communications. A processor may monitor the one or more communications for an utterance. A processor may perform natural language processing (NLP) on the utterance. A processor may generate an understanding of the utterance using natural language understanding (NLU). A processor may detect the anomaly from the understanding of the utterance. A processor may execute a response, responsive to detecting the anomaly.

20 Claims, 25 Drawing Sheets

(56) References Cited

U.S. PATENT DOCUMENTS

| | | | |
|---|---|---|---|
| 10,453,347 B2 | 10/2019 | Winkler | |
| 10,482,774 B2* | 11/2019 | Bonnet | G08G 5/065 |
| 10,620,304 B2 | 4/2020 | Halbert | |
| 10,818,192 B2* | 10/2020 | Chen | G06F 16/334 |
| 2015/0253779 A1* | 9/2015 | Navarro | B64C 39/024 |
| | | | 701/14 |
| 2016/0371989 A1* | 12/2016 | D'Alto | G06Q 50/30 |
| 2016/0379640 A1* | 12/2016 | Joshi | G01C 23/00 |
| | | | 704/235 |
| 2017/0124734 A1* | 5/2017 | Gowda | G08G 5/0013 |
| 2018/0060298 A1* | 3/2018 | Le Roux | G08G 5/0013 |
| 2018/0096607 A1* | 4/2018 | Cotdeloup | G06F 40/35 |
| 2019/0244528 A1* | 8/2019 | Srinivasan | G08G 5/0013 |
| 2019/0311638 A1* | 10/2019 | Srinivasan | G08G 5/0013 |
| 2020/0317365 A1* | 10/2020 | Sherry | B64D 43/00 |
| 2021/0043095 A1* | 2/2021 | Venkataraman | G08G 5/025 |
| 2022/0383879 A1* | 12/2022 | Agarwal | G10L 17/04 |

OTHER PUBLICATIONS

"[Real ATC] Skywest CRJ9 descends below minimum altitude | Terrain Alert", YouTube, Mar. 24, 2018, 2 pages, <https://www.youtube.com/watch?v=FMUJnFr99rY&feature=youtu.be.

"Fatigue Management Guide for Air Traffic Service Providers", ICAO, CANSO, First Edition, 2016, 148 pages.

"Information Security—FAA Needs to Address Weaknesses in Air Traffic Control Systems", United States Government Accountability Office, Report to Congressional Requesters, GAO-15-221, Jan. 2015, 46 pages.

"Medium Term Conflict Detection (MTCD)", SKYbrary Aviation Safety, This page was last edited on Oct. 9, 2019, at 15:54, 6 pages, <https://www.skybrary.aero/index.php/Medium_Term_Conflict_Detection_(MTCD)>.

"Method for Real-Time Voice Communication", An IP.com Prior Art Database Technical Disclosure, Authors et. al.: Disclosed Anonymously, IP.com No. IPCOM000255169D, IP.com Electronic Publication Date: Sep. 6, 2018, 23 pages.

"Method for whole-network anomaly diagnosis", An IP.com Prior Art Database Technical Disclosure, Authors et. al.: Disclosed Anonymously, IP.com No. IPCOM000133709D, IP.com Electronic Publication Date: Feb. 3, 2006, 5 pages.

"Method of Learning Traffic Direction Control System Enabled with UAV Guidance", An IP.com Prior Art Database Technical Disclosure, Authors et. al.: Disclosed Anonymously, IP.com No. IPCOM000259971D, IP.com Electronic Publication Date: Oct. 4, 2019, 7 pages.

"Pilots Avoid a Disaster | Planes crossing in front of a departure!", YouTube, Sep. 25, 2018, 2 pages, <https://www.youtube.com/watch?v=ZCH_qvp1rlE&feature=youtu.be>.

Lundberg et al., "The Use of Conflict Detection Tools in Air Traffic Management—an Unobtrusive Eye Tracking Field Experiment During Controller Competence Assurance", HCI-Aero '14, Jul. 30-Aug. 1, 2014, Santa Clara, CA, USA, Copyright 2014 ACM 978-1-4503-2560-Aug. 14, 2007, http://dx.doi.org/10.1145/2669592.2669655, 8 pages.

Matthews et al., "Automated Discovery of Flight Track Anomalies", 33rd Digital Avionics Systems Conference, Oct. 5-9, 2014, © 2014 IEEE, 15 pages.

Mell, et al., "The NIST Definition of Cloud Computing," Recommendations of the National Institute of Standards and Technology, U.S. Department of Commerce, Special Publication 800-145, Sep. 2011, 7 pgs.

Subramanian et al., "Custom IBM Watson Speech-to-text Model for Anomaly Detection using ATC-pilot Voice Communication", downloaded from the internet on Sep. 15, 2020, 12 pages.

Vartabedian, et al., "IBM Wins Over Hughes to Build $3.6-Billion Air Traffic Control System." Published Jul. 26, 1988. 9 pages. Published by LA Times. https://www.latimes.com/archives/la-xpm-1988-07-26-fi-6293-story.html.

Yasar, M., "Flight Anomaly Tracking for Improved Situational Awareness: Case Study of Germanwings Flight 9525", Annual Conference of the Prognostics and Health Management Society 2016, 7 pages.

* cited by examiner

1100

| ID | Name | Source | Controller Identity | Channel | Airport |
|---|---|---|---|---|---|
| 1 | All scope | ALL | ALL | ALL | ALL |
| 2 | KIAD Tower Aircraft | ALL | ALL | ALL | KIAD |
| 3 | KIAD Trainees | ALL | Trainee Group | ALL | KIAD |
| 4 | KIAD Ground | ATC, Ground Vehicle, Aircraft | ALL | Ground | KIAD |
| 5 | KIAD Approach | ATC, Aircraft | ALL | Approach, Tower | KIAD |
| ... | ... | ... | ... | ... | ... |

Anomaly Policy

| ID | Name | Type | Description | Trigger Rule | Trigger Utterance Min Confidence (%) | Targets |
|---|---|---|---|---|---|---|
| 1 | Runway incursion during takeoff | ATC Instruction vs ATC Instruction | Controller clears aircraft for takeoff and gives runway crossing clearance or landing clearance for same or intersecting runway | TriggerUtterance.type = "Instruction" AND TriggerUtterance.intent = "Takeoff Clearance" | 60 | 5,6,7,8 |
| ... | ... | ... | ... | ... | ... | ... |

Targets

| ID | Target Name | Target Rule | Trigger Utterance Min Confidence (%) | Maximum Time (seconds) | Timeout target type? |
|---|---|---|---|---|---|
| ... | ... | ... | ... | ... | ... |
| 5 | Runway Crossing same runway | TargetUtterance.intent = "Runway Crossing Clearance" AND TargetUtterance.runway = TriggerUtterance.runway | 50 | 120 | No |
| 6 | Landing Clearance same runway | TargetUtterance.intent = "Landing Clearance" AND TargetUtterance.runway = TriggerUtterance.runway | 50 | 240 | No |
| 7 | Landing Clearance intersecting runway | TargetUtterance.intent = "Landing Clearance" AND TargetUtterance.runway = isIntersecting(TriggerUtterance.runway) | 50 | 240 | No |
| 8 | Landing Clearance same surface (i.e. opposite direction on same runway) | TargetUtterance.intent = "Landing Clearance" AND isSamePhysicalSurface(TriggerUtterance.runway, TargetUtterance.runway) | 50 | 240 | No |
| ... | ... | ... | ... | ... | ... |

| ID | Name | Controller Audible | Supervisor Audible | Controller screen (or visual) | Supervisor screen (or visual) | Email | Vibration | Haptic | Notify aircraft | Logging |
|---|---|---|---|---|---|---|---|---|---|---|
| 1 | LowSeverity | N | N | Y | N | supervisor@atctower.com | N | N | N | Atc.loggingserver.com |
| 2 | MediumSeverity | N | N | Y | Y | supervisor@atctower.com | N | Y | N | Atc.loggingserver.com |
| 3 | HighSeverity | Y | Y | Y | Y | supervisor@atctower.com | N | Y | Y | Atc.loggingserver.com |
| 4 | CriticalSeverity | Y | Y | Y | Y | supervisor@atctower.com | Y | Y | Y | Atc.loggingserver.com |
| 5 | Custom1 | N | N | Y | N | custom@atctower.com | N | Y | N | Atc2.loggingserver.com |
| 6 | TestLogOnly | N | N | N | N | - | N | N | N | test.loggingserver.com |
| ... | ... | ... | ... | ... | ... | ... | ... | ... | ... | ... |

| ID | Name | Enabled | Scope Policy | Anomaly Policy | Response Policy |
|---|---|---|---|---|---|
| 1 | Runway Incursion During Takeoff | Y | 2 | 1 | 4 |
| 2 | Timeout for Check-in on Approach | Y | 5 | 2 | 1 |
| 3 | Incorrect Readback | Y | 1 | 3 | 2 |
| 4 | Log Only | N | 1 | ALL | 6 |
| ... | ... | ... | ... | ... | ... |

FIG. 14

| ID | Type | Anomaly Trigger | Anomaly Target | Examples | Static and Dynamic Data Sources |
|---|---|---|---|---|---|
| 1 | ATC Instruction vs ATC Instruction | ATC utterance | ATC utterance (different instruction than trigger) | "Cleared for takeoff" vs "Cross Runway", vehicles on runway. | None |
| 2 | ATC Instruction vs Ground Airport Context | ATC utterance | Airport ground context | Taxi instructions don't make sense based on airport layout. Use of closed runway/taxiway. | Static ground airport context - runways, crossing, taxiways, gates<br><br>Dynamic ground airport context - runway/taxiway closures, Notice to Airmen, Meteorological Aerodrome Reports |
| 3 | Readback vs Ground Airport Context | Aircraft utterance | Airport ground context | Readback doesn't make sense based on airport layout. Use of closed runway/taxiway. | Static ground airport context - runways, crossing, taxiways, gates<br><br>Dynamic ground airport context - runway/taxiway closures, Notice to Airmen, Meteorological Aerodrome Reports |
| 4 | Request vs Ground Airport Context | Aircraft utterance | Airport ground context | Request doesn't make sense based on airport layout. Use of closed runway/taxiway. Clearance of runway deposits in progress. | Static ground airport context - runways, crossing, taxiways, gates<br><br>Dynamic ground airport context - runway/taxiway closures, Notice to Airmen, Meteorological Aerodrome Reports |
| 5 | ATC Instruction vs Airspace Context | ATC utterance | Airspace context | Instruction deviates from published airspace approaches/departures. | Static airspace context - instrument approach/ departure procedures<br><br>Dynamic airspace context - Air Route Traffic Control Center, Notice to Airmen, Temporary Flight Restrictions, other special notices/advisories, Meteorological Aerodrome Reports |

| ID | Type | Anomaly Trigger | Anomaly Target | Examples | Static and Dynamic Data Sources |
|---|---|---|---|---|---|
| 6 | Readback vs Airspace Context | Aircraft utterance | Airspace context | Readback deviates from published airspace approaches/departures. | Static airspace context - instrument approach/departure procedures<br><br>Dynamic airspace context - Air Route Traffic Control Center notices, Notice to Airmen, Temporary Flight Restrictions, Meteorological Aerodrome Reports |
| 7 | Request vs Airspace Context | Aircraft utterance | Airspace context | Request deviates from published airspace approaches/departures. | Static airspace context - instrument approach/departure procedures<br><br>Dynamic airspace context - Air Route Traffic Control Center notices, Notice to Airmen, Temporary Flight Restrictions, Meteorological Aerodrome Reports |
| 8 | ATC Instruction vs Convention | ATC utterance | Convention corpus | Deviate from flight level conventions. | Convention corpus, consisting of:<br>• Global conventions/rules<br>• National conventions/rules<br>• Local conventions/rules |
| 9 | Request vs Convention | Aircraft utterance | Convention corpus | Deviate from flight level conventions. | Convention corpus, consisting of:<br>• Global conventions/rules<br>• National conventions/rules<br>• Local conventions/rules |
| 10 | ATC Instruction vs Readback | ATC utterance | Aircraft utterance | "Cleared to land runway 19R", "Cleared to land runway 19L." | None |

FIG. 15B

| ID | Type | Anomaly Trigger | Anomaly Target | Examples | Static and Dynamic Data Sources |
|----|------|-----------------|----------------|----------|-------------------------------|
| 11 | ATC Instruction vs Check-in | ATC utterance | Aircraft utterance | ATC Approach instructs landing on runway 19R and contact Tower freq. Pilot performs readback correctly. During check-in with tower pilot states 19L. | None |
| 12 | Request vs ATC Instruction | Aircraft utterance | ATC utterance | Pilot requests to land on 19L. ATC approves 19R. | None |
| 13 | Readback timeout | ATC utterance | Timer | No pilot readback in expected time Window. "Cleared to land 19R" <No response> | None |
| 14 | Check-in timeout | Aircraft utterance | Timer | ATC instructs change of frequency. Pilot performs readback correctly. Aircraft does not check-in on new frequency. | None |
| 15 | ATC Instruction sequence timeout | ATC utterance | Timer | ATC deviates aircraft and does not follow-up with subsequent instruction in timely manner. "Line up and wait" with no "Cleared for takeoff." | Sequence mapping of instructions |

FIG. 15C

| ID | Type | Anomaly Trigger | Anomaly Target | Examples | Static and Dynamic Data Sources |
|---|---|---|---|---|---|
| 16 | ATC Instruction sequence anomaly | ATC utterance | ATC utterance, or Aircraft utterance | A step is skipped in a standard sequence. | Sequence mapping of instructions |
| 17 | Aircraft sequence anomaly | Aircraft utterance | ATC utterance, or Aircraft utterance | A step is skipped in a standard sequence. | Sequence mapping of instructions |
| 18 | ATC standard phraseology anomaly | ATC utterance | Common phraseology errors | "Not yet" in response to a request (can be heard as "yeah"). | Listing of common phraseology errors |
| 19 | Aircraft standard phraseology anomaly | Aircraft utterance | Common phraseology errors | "Aircraft X with you 13 for 33" rather than "aircraft X with you at 13 thousand climbing to flight level 330." | Listing of common phraseology errors |
| 20 | ATC Instruction vs Aircraft operating parameters | ATC utterance | ATC utterance | Instruct aircraft to climb above max altitude. | Aircraft registry, Aircraft operating parameters |
| 21 | Aircraft distress | Aircraft utterance | List of distress keywords | "MAYDAY," "PAN-PAN," "MAYDAY MAYDAY MAYDAY," "PAN-PAN PAN-PAN PAN-PAN," "Engine failure," "Lost control." | List of distress keywords |

FIG. 15D

| ID | Source | Identity | Channel | Airport | Type | Intent | Callsign | Runway | Taxiway | ... | Timestamp | Confidence | ... |
|---|---|---|---|---|---|---|---|---|---|---|---|---|---|
| 4550 | ATC | John Doe | Tower | KIAD | Instruction | Takeoff Clearance | United 326 | 19O | - | | WWWW.1 | 90 | ... |
| ... | | | | | | | | | | | | | |
| 4567 | ATC | John Doe | Tower | KIAD | Instruction | Runway Crossing Clearance | American 2784 | 19C | Whiskey-2 | | XXXX.1 | 95 | ... |
| 4568 | ATC | John Doe | Tower | KIAD | Instruction | Taxi | American 2784 | 19C | Whiskey-6 | | XXXX.2 | 85 | ... |
| 4569 | ATC | John Doe | Tower | KIAD | Instruction | Hold Short | American 2784 | 19C | Yankee | | XXXX.3 | 80 | ... |
| ... | ... | ... | ... | ... | ... | ... | ... | ... | ... | ... | ... | ... | ... |

| ID | Location | Object Type | Object Identifier | Object Start | Object End | Status | Start Date | Start Time | End Date | End Time | Source Type | Source Reference |
|---|---|---|---|---|---|---|---|---|---|---|---|---|
|  | JFK | Taxiway | C | C2 | V | Closed | 12/05/2019 | 16:37 | 02/14/2020 | 09:01 | NOTAM | 12/188 |
|  |  |  |  |  |  | OR |  |  |  |  |  |  |
|  | CPR | Runway | 08 | - | - | Closed | 10/24/2019 | 17:59 | 06/30/2019 | 23:59 | NOTAM | 10/280 |
|  | CPR | Runway | 26 | - | - | Closed | 10/24/2019 | 17:59 | 06/30/2019 | 23:59 | NOTAM | 10/280 |
|  |  |  |  |  |  | OR |  |  |  |  |  |  |
|  | LUKK | Runway | 26 | - | - | Runway clearance in progress | 09/30/2019 | 13:00 | - | - | METAR | - |

FIG. 17

IDENTIFICATION OF ANOMALIES IN AIR TRAFFIC CONTROL COMMUNICATIONS

BACKGROUND

The present disclosure relates generally to the field of monitoring communication feeds, and more particularly to identifying anomalies in communication feeds.

Many industries rely on communication feeds as a primary method of relaying instruction and key information. Communication feeds that involve multiple parties, large equipment, and cascades of instructions, can be complex. As a result of this complexity, there is an increased chance of a disastrous event occurring due to communication related issues.

SUMMARY

Embodiments of the present disclosure include a method, computer program product, and system for identifying anomalies in communications. A processor may monitor the one or more communications for an utterance. The processor may perform natural language processing (NLP) of the utterance. The processor may generate an understanding of the utterance using natural language understanding (NLU). The processor may detect the anomaly from the understanding of the utterance. The processor may execute a response, responsive to detecting the anomaly.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 11 illustrates a simplified table depicting one or more examples of a scope policy, in accordance with embodiments of the present disclosure.

FIG. 12 illustrates a simplified set of tables depicting one or more examples of an anomaly policy and targets definition, in accordance with embodiments of the present disclosure.

FIG. 13 illustrates a simplified table depicting one or more examples of a response policy, in accordance with embodiments of the present disclosure.

FIG. 14 illustrates a simplified table depicting one or more examples of an alert rule, in accordance with embodiments of the present disclosure.

FIG. 15A illustrates a simplified table depicting one or more examples of anomaly types and inputs, in accordance with embodiments of the present disclosure.

FIG. 15B illustrates a simplified table depicting one or more examples of anomaly types and inputs, in accordance with embodiments of the present disclosure.

FIG. 15C illustrates a simplified table depicting one or more examples of anomaly types and inputs, in accordance with embodiments of the present disclosure.

FIG. 15D illustrates a simplified table depicting one or more examples of anomaly types and inputs, in accordance with embodiments of the present disclosure.

FIG. 16 illustrates a simplified table depicting one or more examples of entries in a communication register, in accordance with embodiments of the present disclosure.

FIG. 17 illustrates a simplified table depicting one or more examples of ground and airspace context database, in accordance with embodiments of the present disclosure.

Figure 1:
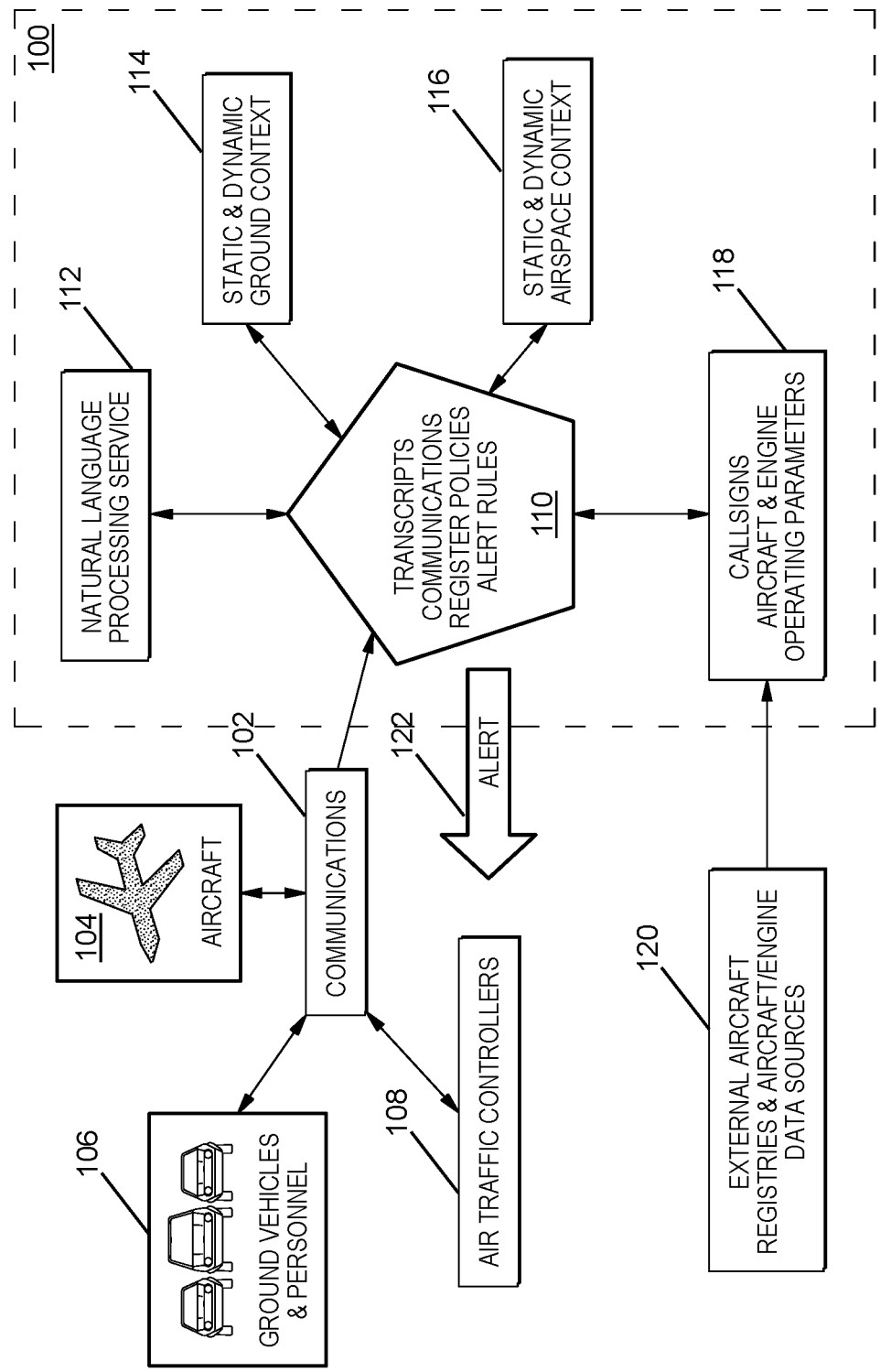
FIG. 1 illustrates a block diagram of an air traffic control (ATC) communication system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of monitoring communication feeds, and more particularly to identifying anomalies in a communication feed that relays instruction and information to multiple parties, such as those communications associated with Air Traffic Control (ATC). While the present disclosure is not necessarily limited to such applications, various aspects of the disclosure may be appreciated through a discussion of various examples using this context.

Traditional ATC communication systems rely heavily on exchanging dynamic instructions and information over a radio call system. Air traffic controllers attempt to produce orderly and efficient flow of multiple aircrafts around various obstacles both in flight and on the ground around airports. As such, air traffic controllers rely heavily on voice communications to exchange instructions and information between several parties associated with directing aircrafts and ground vehicles. Because of the complexity and number of communications in such an environment, mistakes and human errors can occur. Due to the nature of directing multiple pieces of large equipment, even simple mistakes in the aircraft industry can be disastrous. Despite past events, anomalies (e.g., mistakes) in commands exchanged between the air traffic controllers, ground controllers, aircrafts, ground personnel, and ground vehicles, continue to contribute to forced pilot diversions, vehicle and personnel incursions, and operational incidents.

In one example, an air traffic controller could instruct a pilot to land an aircraft at a specific runway (e.g., Runway 9B) but instead of confirming the same runway, the pilot confirms the instruction to land at the wrong runway (e.g., Runway 9E). In this example, due to the similar sounding runway identifiers 9B and 9E, both the air traffic controller and the pilot might consider their communications to be correctly understood. While this is a simple miscommunication, if this potential anomaly is left uncorrected, it could result in an anomaly occurring that can have significant negative outcomes.

Embodiments discussed herein, provide solutions in the form of a method, system, and computer program product for identifying anomalies in ATC communications. Embodiments contemplated herein leverage natural language processing (NLP) and natural language understanding (NLU) to monitor ATC communications and identify/detect anomalies. Once anomalies are detected or identified, embodiments herein may provide a response to reduce or mitigate the effects of the anomaly by executing a response (e.g., audible alarm).

In embodiments, anomalies may include, but are not limited to, conflicting instructions, failure to execute expected sequence of steps, failure to respond or acknowledge instructions within a predetermined amount of time, receiving instruction that conflict with aircraft parameters (e.g., air traffic controller instructs aircraft to fly to a higher altitude than the aircraft's operating parameters allow), an anomaly in phraseology (e.g., confusion caused by similar sounding words between aircraft and air traffic controller), if an instruction conflicts with static or dynamic ground or airspace context (e.g., instruction to land on a runway that is currently closed), and aircraft distress. While specific embodiments often use ATC communication as the main case study and some embodiments discussed herein relate directly to the field of air traffic communications, any communication system having similar considerations and risks (e.g., complex instruction and responses relayed over a communication feed) can be configured with the embodiments discussed herein.

Referring now to FIG. 1, a block diagram of an ATC communication system 100 for identifying anomalies in ATC communication is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, ATC communication system 100 may be configured to receive one or more ATC communications 102. In these embodiments, ATC communications 102 may include ATC utterances from one or more sources. ATC utterances may include, but are not limited to, communications from and/or between aircrafts 104 (e.g., ATC utterances from a pilot or flight crew), ground vehicles and groundcrew 106, and air traffic controllers 108 (e.g., ATC utterances from air traffic controllers in the tower or other locations, such as air traffic controllers not located in the tower).

In embodiments, a processor in (e.g., a processor comprised within ATC communication system 100) may monitor ATC communications. In these embodiments, while monitoring, a processor may be configured to record ATC utterances, record timestamps associated with the ATC utterances, capture source data (e.g., if the source of the communication is ATC or non-ATC), and determine other communication information, such as the communication channel, relevant airports, and controller identity information. This information can be stored within one or more databases/registers depicted by storage block 110. Storage block 110 is used to maintain simplicity and clarity regarding what data is stored and is a general representation of different storage necessary for various embodiments. In embodiments, a processor may convert some or all ATC utterances from speech to text using NLP service 112 to generate transcripts of some or all of the ATC utterances. In these embodiments, transcripts of the ATC utterances may be stored within a transcript database (e.g., generally depicted in storage block 110). In embodiments, recorded ATC utterances and data associated with the understanding of the ATC utterances (e.g., type of utterance, intent of utterance, relevant entities) may be saved in a communication register, generally viewed in storage block 110. In some embodiments, a processor may generate a confidence score (e.g., utterance metadata) for each ATC utterance entry stored within the communication register. In some embodiments, various components of the ATC utterance (e.g., intent, callsign, runway, etc.) may each have a confidence score. In these embodiments, multiple confidence scores may be used to calculate an overall confidence score for the entry or, alternatively, used separately in the anomaly detection process.

In embodiments, the processor may be configured to receive static and dynamic ground context information 114 and static and dynamic airspace context information 116, relevant to the ATC communications and ATC utterances. In one example embodiment, a processor may be configured to receive static ground context information such as airport mapping depicting runways, crossings, taxiways, and gates. In another example embodiments, a processor may be configured to receive dynamic ground context information, such as what airport gates, taxiways, or runways are open and/or the location of various airport vehicles whose purpose requires movement and are not static fixtures. In one example embodiment a processor may be configured to receive static airspace context information, such as particular departure procedures for an aircraft. In another example embodiment, a processor may be configured to receive dynamic airspace context information, such as meteorological reports or other information regarding the positioning of other aircrafts in the airport's vicinity, such as Temporary Flight Restrictions, Notices to Airmen and the like. While FIG. 1 depicts static and dynamic ground context information 114 and static and dynamic airspace context information 116 as separate entities, hereinafter for simplicity such information will be referred to as static and dynamic data sources. Additional examples of static and dynamic data sources can be found in FIGS. 15A-15D. An example embodiment of a ground and airspace context database is depicted in FIG. 17.

In some embodiments, a processor may be configured to receive information regarding a particular aircraft (e.g., the aircraft of the pilot communicating with an air traffic controller). This information may include aircraft callsigns and aircraft and engine operating parameters, and stored in a database of aircraft and engine operating parameters 118. In some embodiments, a processor may retrieve this information from external aircraft registries and aircraft/engine data sources 120. More particularly, this information may include data regarding an aircraft's maximum speed, maximum altitude, and/or any other operating parameter that may be necessary for ATC communication system 100 to identify an anomaly. In embodiments, ATC communication system 100 may be configured to use this information to detect anomalies in ATC communications and execute a response to mitigate or eliminate the negative outcomes potentially associated with the detected anomaly. In some embodiments a processor may execute a response that creates an alert 122 to air traffic controllers, aircraft, or other communication participants. Examples of such response alerts are provided in FIG. 13.

Figure 2:
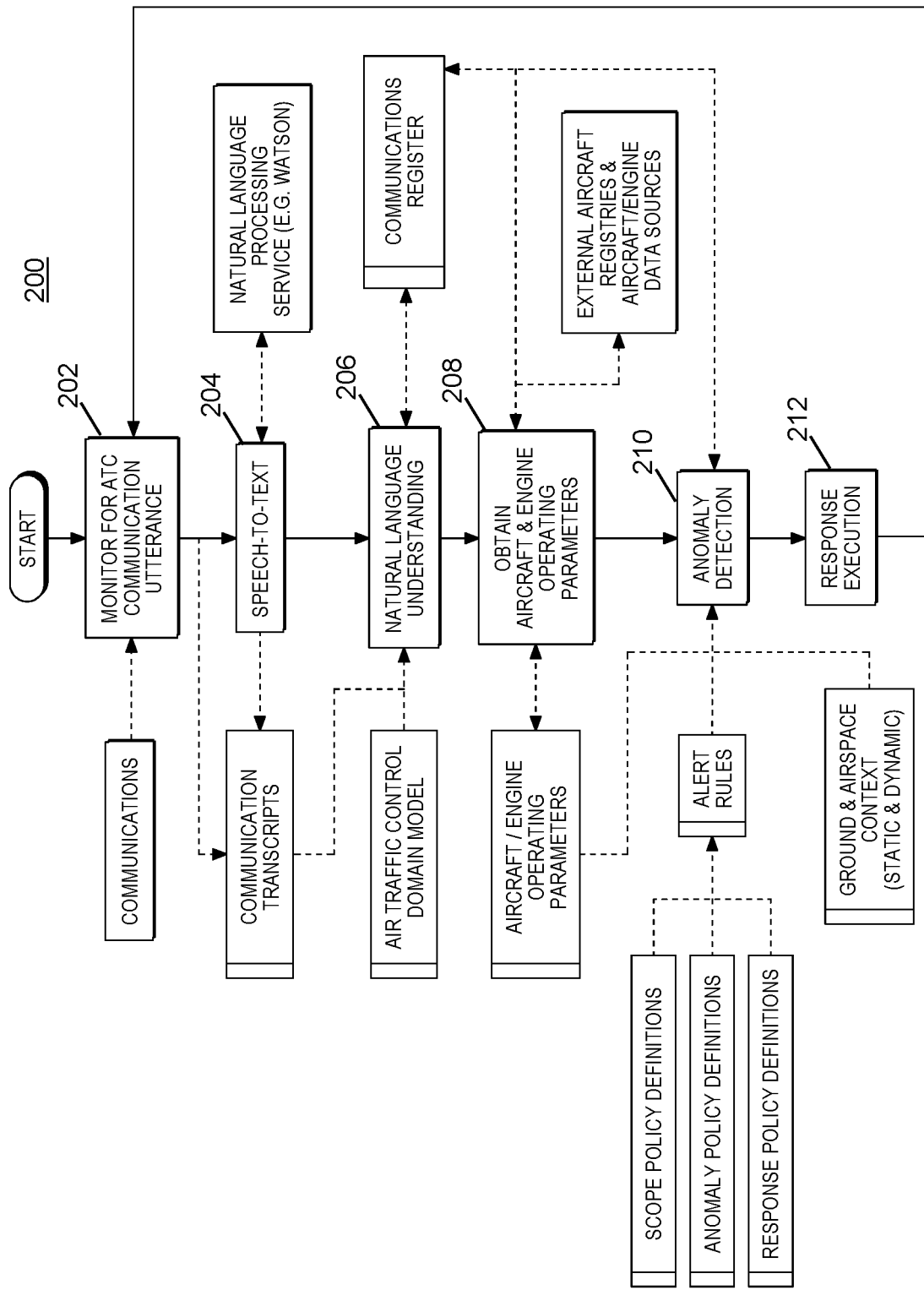
FIG. 2 illustrates a flowchart of a method for identifying an anomaly in ATC communications, in accordance with embodiments of the present disclosure.

Referring now to FIG. 2, a flowchart illustrating the general method 200 for identifying anomalies in ATC communications is depicted in accordance with embodiments of the present disclosure. In some embodiments, as discussed briefly above, the method 200 begins at operation 202 where a processor monitors the ATC communication for ATC utterances. In some embodiments, at operation 202, the processor may capture an audio recording of the utterance, and may determine one or more pieces of utterance metadata. Utterance metadata may include, but is not limited to, any data associated with the ATC utterance such as the timestamp, airport identifier (e.g., KIAD), communication channel or frequency (e.g., Tower), and the source of the utterance (e.g., ATC or non-ATC). In some embodiments, a processor can identify the speaker of the ATC utterance. For example, the air traffic controller who is communicating may be identified via an integration to an ATC identity system. A more detailed discussion regarding the process monitoring ATC communications can be viewed in reference to FIG. 4. In some embodiments, the method 200 proceeds to operation 204.

In embodiments, at operation 204, a processor may convert the one or more ATC f from speech to text using an NLP service (e.g., IBM Watson®) to generate text transcripts of the utterances. An example of an ATC communication transcript may be "American two seven eight four at whiskey two cross 19C, taxi via yankee six there and hold short of taxiway yankee." In some embodiments, the transcripts of the ATC utterances (e.g., from the ATC communication) are stored in a transcript database. In some embodiments, at operation 204, a processor may determine one or more pieces of utterance metadata. Utterance metadata may include, but is not limited to, any data associated with the particular ATC utterance, such as confidence score. In some embodiments, a processor can identify the speaker of the ATC utterance. For example, a pilot and an air traffic controller who are communicating can each be identified from the generated transcripts of the one or more ATC utterances in the ATC communication. A more detailed discussion regarding the speech to text operation can be viewed in reference to FIG. 5. In some embodiments, the method 200 proceeds to operation 206.

At operation 206, a processor may use natural language understanding (NLU) to determine an understanding of the ATC utterance. In some embodiments, a processor may be configured to retrieve recorded ATC transcripts, previous communications from the communication register and/or an ATC domain model. In embodiments, an ATC domain model may be a representation of an ATC knowledge domain with concepts, roles datatypes, individuals, and rules (e.g., ATC standard phraseology, relationships, intents, etc.). In embodiments, a processor can use NLU to extract understandings from the transcript generated by NLP. For example, a processor can be configured to use NLU to determine understandings from the transcript associated with the type of ATC utterance (e.g., if the ATC utterance is an instruction), the intent of the ATC utterance (e.g., intent of instruction is to provide runway crossing clearance), and/or relevant entities of the ATC utterance (e.g., aspects of the ATC utterance that are related to the ATC action including but not limited to runway identifiers, taxiway identifiers, urgency, callsigns and the like).

In some embodiments, the ATC domain model may be used to determine the type, intent, and relevant entities of the ATC utterance. In some embodiments, additional data, such as static and dynamic data sources (e.g., static and dynamic ground context information 114 and static and dynamic airspace context information 116) may also be used by a processor to determine understandings (e.g., type, intent, and/or relevant entities). In embodiments, a processor may generate an ATC action record for each ATC intent extracted from the ATC utterance. In embodiments, an ATC action record may include, but is not limited to utterance metadata, entities related to that ATC action, and utterance general entities. In some embodiments, a processor may perform callsign normalization to determine the callsign of participants in the communication, and update the communications register with this information. A more detailed discussion regarding the process of callsign normalization can be viewed in reference to FIG. 7. A more detailed discussion regarding the process of NLU can be viewed in reference to FIG. 6. In some embodiments, the method 200 proceeds to operation 208.

At operation 208, a processor may optionally obtain aircraft and engine operating parameters (e.g., received from aircraft callsigns and a database of aircraft and engine operating parameters 118). In embodiments, a processor may collect information from the recorded ATC action records stored in the communication register to determine what parameters are relevant aircraft and engine operating parameters. In embodiments, external aircraft registries and/or aircraft and engine data sources (e.g., manufacturer databases) may be queried to determine aircraft and engine operating parameters. In some embodiments, the method 200 proceeds to operation 210. A more detailed discussion regarding obtaining aircraft and engine operating parameters can be viewed in reference to FIG. 8.

At operation 210, a processor may detect or identify one or more anomalies in the ATC utterances (e.g., existing communications). In embodiments, a processor may identify an anomaly using an alert rule. In embodiments, an alert rule is comprised of a scope policy, anomaly policy, and a response policy. While in some embodiments, each alert rule includes a single scope policy, anomaly policy, and response policy, in other embodiments, multiple scope polices, anomaly policies and response policies may be included in an alert rule (e.g., the resulting alert rule is a combination of the individually specified policies). Such embodiments allow for the use of types, groups, or categories of entities (e.g., predefining which anomaly policies together form a group, and specifying the group identifier). In some embodiments, at operation 210, a processor may check each ATC utterance against an available alert rule. In some embodiments, this may include a processor checking each the scope policy, the anomaly policy, and the response policy. A more detailed discussion regarding alert rules and alert rule creation can be viewed in reference to FIG. 3, while a more detailed discussion of anomaly detection can be viewed in reference to FIGS. 9A-9C. In some embodiments, the method 200 proceeds to operation 212.

At operation 212, a processor may execute a response for each detected/identified anomaly, based on the response policy. A response may include, but is not limited to a vibration alarm, haptic alarm, screen/virtual alarm, audible alarm, logging server, chat server, email, mobile message, or a message to the aircraft. A more detailed discussion regarding response execution can be viewed in reference to FIG. 10. In some embodiments, after operation 212 method 200 may end. In other embodiments, after operation 212 the process may continuously cycle to process subsequent utterances.

As discussed in more detail herein, it is contemplated that some or all of the operations of the method 200 may be performed in alternative orders or may not be performed at all; furthermore, multiple operations may occur at the same time or as an internal part of a larger process.

Figure 3:
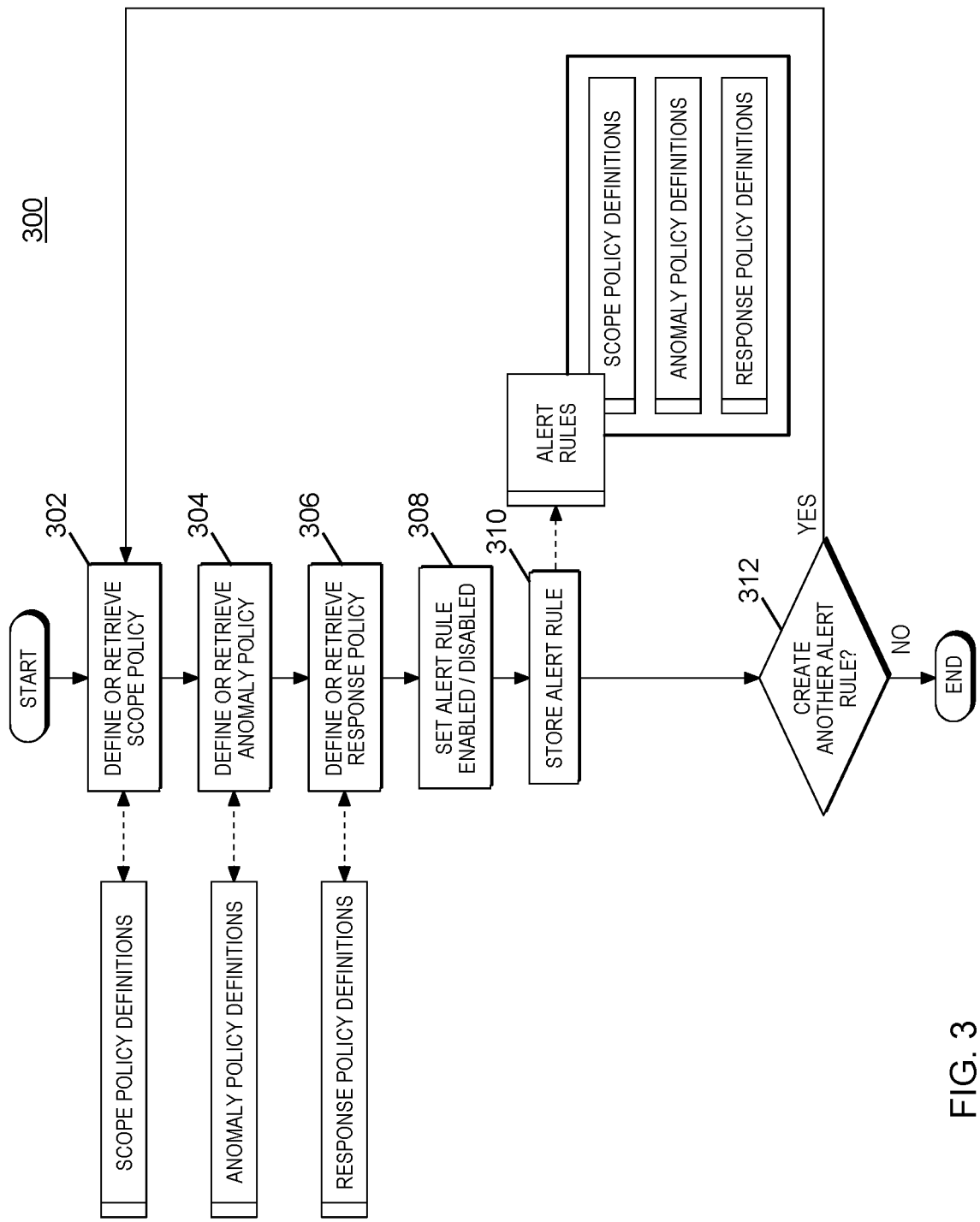
FIG. 3 illustrates a flowchart of a method of generating alert rules, in accordance with embodiments of the present disclosure.

Referring now to FIG. 3, a flowchart illustrating the method 300 for creating an alert rule is depicted in accordance with embodiments of the present disclosure. In some embodiments, the method 300 begins at operation 302 where a processor may define a new scope policy or retrieve an existing scope policy. In embodiments, a scope policy may be defined as a combination of one or more source (e.g., air traffic controller, aircraft, ground vehicle, etc.), identify of person speaking ATC utterance (e.g., identity of air traffic controller), channel (e.g., tower, ground, apron, approach, etc.), airport (e.g., International Air Transport Association (IATA) code, International Civil Aviation organization (ICAO) code, or any other unique airspace identifier). In some embodiments, the method 300 proceeds to operation 304.

At operation 304, a processor may define a new anomaly policy or retrieve an existing anomaly policy. In embodiments, an anomaly policy may include one or more anomaly identifiers (e.g., anomaly ID #1), anomaly name, anomaly type (e.g., ATC instruction vs. ATC instruction), anomaly description, trigger rule, trigger utterance minimum confidence threshold, one or more references to targets. (See FIG. 12 for a simplified table depicting an anomaly policy). In some embodiments, one or more references to targets may include a target identifier, a target name, a target rule, a target utterance minimum confidence threshold, maximum time, a flag to determine whether the target is a timeout target type. (See FIG. 12 for a simplified table depicting targets definition. See FIGS. 9A-9C for more discussion regarding timeout targets). In some embodiments, the method 300 proceeds to operation 306.

At operation 306, a processor may define a new response policy or retrieve an existing response policy. In embodiments, a response policy may include sending an alarm or indicator to an air traffic controller or supervisor. In some embodiments, the alarm or response may be a screen or visual alarm, an audible alarm, a haptic alarm and/or a vibration alarm. In some embodiments, a processor may send an alert to a logging server, chat server, an email, a mobile device application or message, and/or send a message to the relevant aircrafts or other participants in the communication. In some embodiments, the method 300 proceeds to operation 308.

At operation 308, a processor may set alert rule as enabled or disabled. In some embodiments, the method 300 proceeds to operation 310.

At operation 310, a processor may store the alert rule. In some embodiments, the method 300 proceeds to operation 312.

At operation 312, a processor may determine if another alert rule should be created. In embodiments where a processor determines another alert rule should be created (decision branch "Yes"), a processor may return to operation 302 and initiate method 300 again. In embodiments where a processor determines another alert rule should not be created (decision branch "No" of operation 312), the method may end.

As discussed in more detail herein, it is contemplated that some or all of the operations of the method 300 may be performed in alternative orders or may not be performed at all; furthermore, multiple operations may occur at the same time or as an internal part of a larger process.

Figure 4:
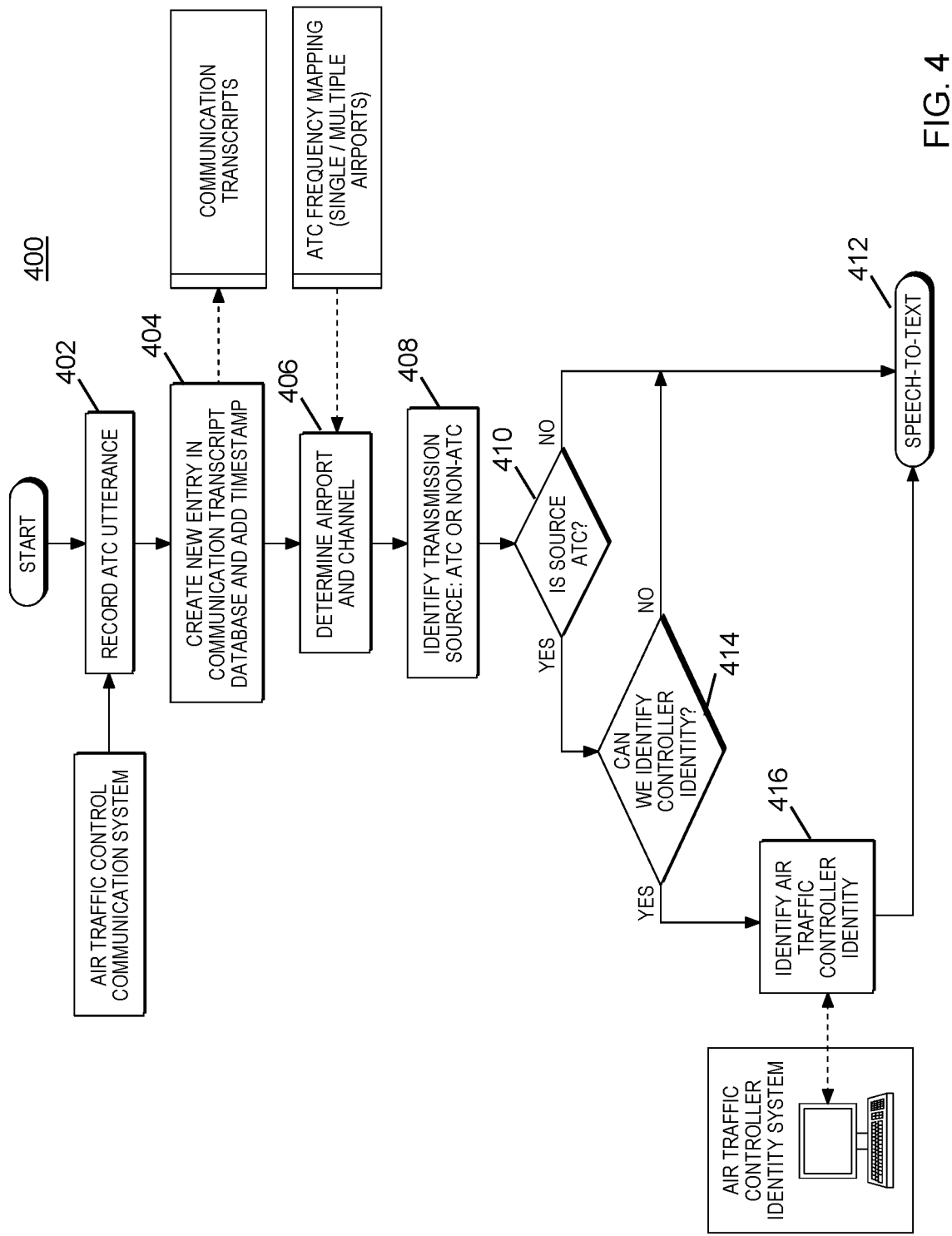
FIG. 4 illustrates a flowchart of a method of monitoring an ATC communication channel and initial identification of the communication participants, in accordance with embodiments of the present disclosure.

Referring now to FIG. 4, a flowchart illustrating the method 400 for monitoring an ATC communication for one or more ATC utterances is depicted in accordance with embodiments of the present disclosure. In some embodiments, the method 400 begins at operation 402 where a processor may record one or more ATC utterances from the ATC communication. In some embodiments, recording may be continuous in the form of streaming processing. In some embodiments, the method 400 proceeds to operation 404.

At operation 404, a processor may generate a new entry in communication transcript database. In embodiments, a processor may also add a timestamp to the entry. In some embodiments, the method 400 proceeds to operation 406.

At operation 406, a processor may determine what airport and channel are associated with the ATC utterance. In some embodiments, a processor may use ATC frequency mapping to determine the airport or channel. For example, a processor may analyze an ATC utterance and determine that the channel is "tower" and the particular airport is "KIAD." In these embodiments, such ATC frequency mapping may be associated with a single airport or multiple airports. In some embodiments, method 400 may proceed to operation 408.

At operation 408, a processor may identify a transmission source (e.g., ATC or non-ATC). In embodiments, because the system resides on the ATC side, it is possible to know at the time of recording the ATC utterance whether the source of the transmission was ATC or not. In many cases when the source is not ATC, the source will be an aircraft. However, in some embodiments, the source may include, but is not limited to, ground vehicles, police services, fire services, or any other party that may be associated with an ATC communication. While a processor monitoring the communication for ATC utterances may determine the ATC as a source, in some embodiments, other sources (e.g., non-ATC sources) may be identified/classified during the NLU process as described in step 614 of FIG. 6. In embodiments, the method 400 may proceed to operation 410.

Figure 5:
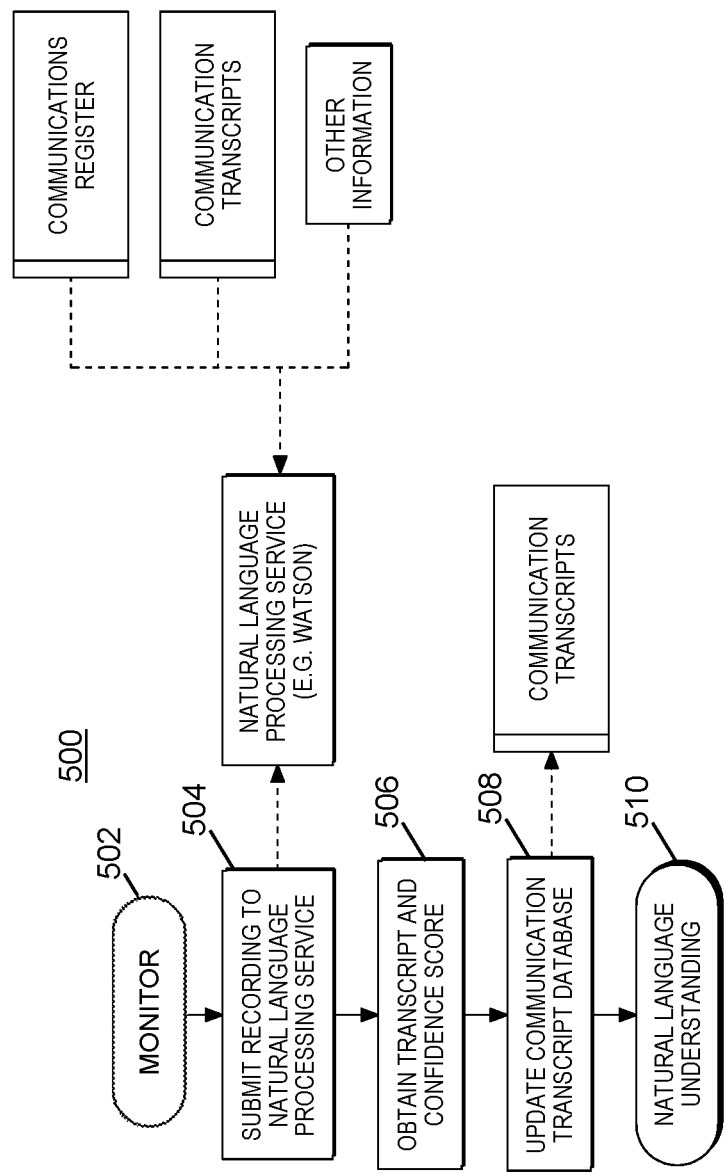
FIG. 5 illustrates a flowchart of a method of processing ATC utterances from speech to text, in accordance with embodiments of the present disclosure.

At operation 410, a processor may determine if the source is ATC. In embodiments where a processor determines the source is not ATC (decision branch "No") method 400 may proceed to operation 412. At operation step 412, a processor may proceed to speech-to-text processing (NLP) as depicted in FIG. 5. In embodiments where a processor determines the source is ATC (decision branch "Yes") method 400 proceeds to operation 414.

At operation 414, a processor may analyze the ATC utterance, or the source of the ATC utterance, and determine if the system can identify the air traffic controller identity (for example, name, identification number, station number, and the like). In these embodiments an ATC controller identity may be known because the system is on the ATC side, and can interface with other components or systems involved in ATC communications. In these embodiments, the system could be integrated with a system that understands who is speaking on what channel and/or from what ATC station. Such embodiments may provide a finer grained scope while identifying anomalies. In embodiments where the processor cannot determine the air traffic controller identity (decision branch "No"), method 400 may proceed to operation 412. In embodiments where the processor can determine the air traffic controller identity (decision branch "Yes") method 400 may proceed to operation 416.

At operation 416, a processor may identify additional attributes about the particular air traffic controller speaking the ATC utterance. In one example embodiment, a processor may determine and/or access attributes such as an air traffic controller's level of experience, certifications, trainee status, incident history and/or user preferences. In some embodiments, a processor may determine a particular air traffic controller has an elevated level of monitoring, while other air traffic controllers are excluded from the monitoring based on their attributes. In some embodiments, user preferences may allow for controllers to indicate how they prefer to be notified of an anomaly (for example, visual alarm, vibration, etc.). In some embodiments, a processor may have access to an air traffic controller identity system that contains one or more air traffic controller identities and attributes. In some embodiments, the processor may update the communication transcript database at each operation. For example, in one example embodiment, the processor may update the communication transcript database at each operation 402, 404, 406, 408, 410, 414, and/or operation 416. In this example embodiment, the ultimate communication transcript database could have information associated with the ATC utterance including, a source, a channel, the particular airport, a timestamp, and the identity of the air traffic controller. At operation 412, the processor may proceed to speech-to-text processing as described by FIG. 5. In some embodiments, the method 400 associated with monitoring ATC utterances may end.

Referring now to FIG. 5, a flowchart illustrating an example method 500 for converting an ATC utterance from speech to text is depicted in accordance with embodiments of the present disclosure. In some embodiments, the method 500 begins at operation 502 where a processor may ingest/receive an ATC utterance monitored as part of method 400 (e.g., FIG. 4), as was recorded in operation 402. In some embodiments, method 500 may proceed to operation 504.

At operation 504, a processor may submit a recording of the ATC utterance to a NLP service (e.g., IBM Watson®). In some embodiments, a NLP service provides speech-to-text processing of the ATC utterance. In embodiments, a processor may be configured to provide the NLP service with access to a communication register and communication transcripts. In embodiments, a processor may provide input from one or more previous ATC communication (e.g., communication transcripts) to the NLP service to assist with speech-to-text capabilities. In some embodiments, the NLP service may be trained with standard ATC phraseology. In some embodiments where the identity of the speaker of the ATC utterance is not known, the NLP service could provide an indication of each speaker (e.g., speaker 1, speaker 2, and/or speaker 3) in order to identify unique voice signatures. In some embodiments, a processor may provide the NLP service with access to static and dynamic data sources, such as airport static ground context information (e.g., runway, crossings, taxiways, gates, etc.), airport dynamic ground context information (e.g., runway/taxiway closures, notices to airmen (NOTAMs), METAR/SPECI (Meteorological Aerodrome Report/Selected Special Weather Report providing weather reports and advisories)), static airspace context information (e.g., terrain, waypoints, published approaches and departures), dynamic airspace context information (e.g., NOTAMs, temporary flight restrictions (TFRs), notices, METAR/SPECI, advisories), a ATC phraseology convention corpus (e.g., global, national, and local conventions), and communication standard sequence mapping (e.g., normal order of ATC communication sequences). In some embodiments, a processor may assist the speech-to-text processing with knowledge of local relevant entities such as runway numbers. In one example embodiment, "19C" may be heard as "19V" but if there are no "19V" runways located at the airport, then the system would know to use "19C." In these embodiments, such information may be used on a limited basis as the purpose of the system is to identify mistakes. In some embodiments, method 500 may proceed to operation 506.

At operation 506, a processor may obtain a transcript of the ATC utterance and a confidence score. In embodiments, a confidence score is generated for the full transcript. In other embodiments, a confidence score may be generated for each word, or combination of words. In one example embodiment, a transcript of the ATC utterance may be "American two seven eight four at whiskey two cross 19C, taxi via yankee six there and hold short of taxiway yankee," with a confidence score of 85 out of 100. In some embodiments, method 500 may proceed to operation 508.

At operation 508, a processor may update a communication transcript database. In embodiments, a processor may update the communication transcript database with the communication transcripts and the confidence score. In this example embodiment, the ultimate communication transcript database could have information associated with the ATC utterance including, a source, a channel, the particular airport, a timestamp, and the identity of the air traffic controller, transcript and confidence score. In some embodiments, method 500 may proceed to operation 510.

Figure 6:
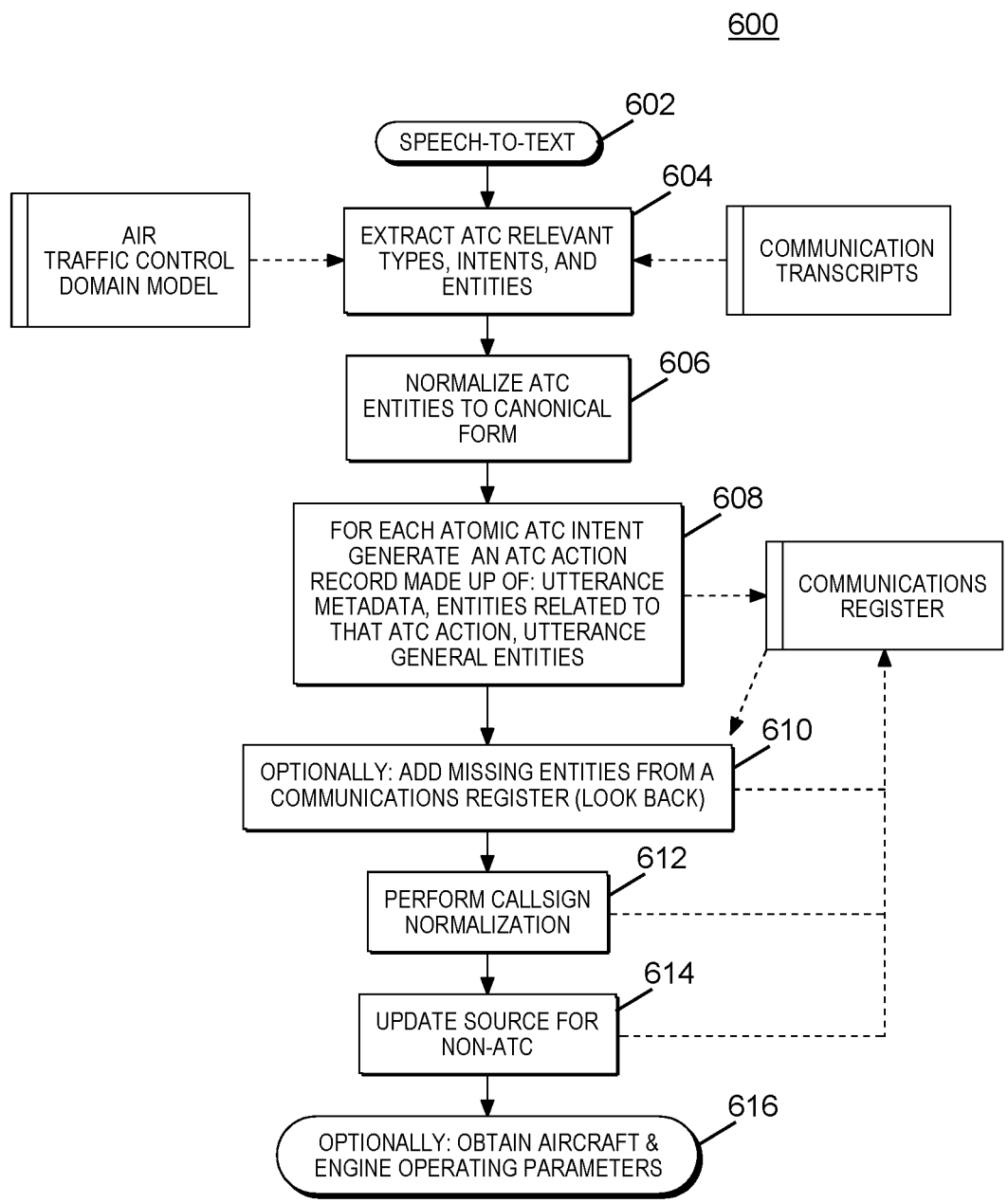
FIG. 6 illustrates a flowchart of a method for processing ATC communications to generate an understanding of ATC utterances, in accordance with embodiments of the present disclosure.

At operation 510, a processor may proceed to NLU processing as described by FIG. 6. In some embodiments, the method 500 associated with speech-to-text processing may end.

Referring now to FIG. 6, a flowchart illustrating an example method 600 for performing NLU processing, is depicted in accordance with embodiments of the present disclosure. In some embodiments, the method 600 begins at operation 602 where a processor may be configured to receive speech-to-text information associated with one or more ATC utterances (e.g., from a NLP service), such as that speech-to-text information referenced in regard to FIG. 5. In some embodiments, method 600 may proceed to operation 604.

At operation 604, a processor may extract ATC relevant types, intents, and entities from the communication transcript. In these embodiments, a processor may be configured to use an ATC domain model to understand ATC relevant types, intents, and entities. An ATC domain model may include, but is not limited to, ATC standard phraseology, relationships, intents, and other ATC related information. In embodiments, a processor may be configured to use communication transcripts of ATC utterances from the communication transcript database, where each transcript has associated metadata (such as a source, a channel, the particular airport, a timestamp, the identity of the air traffic controller, a confidence score), to extract ATC relevant types, intents, and entities from the transcript. In some embodiments, method 600 may proceed to operation 606.

At operation 606, a processor may normalize ATC entities to canonical form. In some embodiments, method 600 may proceed to operation 608.

At operation 608, a processor may generate an ATC action record for each atomic ATC intent. In embodiments, an intent may include, but is not limited to, runway crossing clearance, takeoff clearance, taxi, or hold. In embodiments, each ATC action record has an associated type. In embodiments, a type may include, but is not limited to an instruction, a readback, a check-in, a request, or informational. In embodiments, an ATC action record may be comprised of utterance metadata (e.g., source, channel, the particular airport, a timestamp, the identity of the air traffic controller, confidence score), entities related to the particular ATC action, and other utterance general entities. In embodiments, an entity may include information, such as a particular runway (e.g., 19C, 1, 27), taxiway (e.g., Yankee-6, Mike-4, Yankee, Whiskey-2, Whiskey-Kilo), urgency (e.g., no delay), and/or callsign (e.g., American 2784, Speedbird 80 Golf Heavy). In some embodiments, each atomic ATC action record has an associated confidence score. In some embodiments, this atomic ATC action record may be stored or saved in a communications register as depicted in FIG. 16. In some embodiments, method 600 may proceed to operation 610.

At operation 610, a processor may optionally add missing entities to an entry in the communication register. In these embodiments, a processor may look back at historical entries in the communication register and determine if there are missing entities in the current ATC action record being processed, and what the missing entities are. In embodiments, the added missing entities may be updated in the currently processed ATC action record in the communication register. In some embodiments, method 600 may proceed to operation 612.

At operation 612, a processor may perform callsign normalization. In embodiments, a processor may update the currently processed ATC action record in the communication register with the normalized callsigns. Additional information regarding the method for callsign normalization may be viewed in reference to FIG. 7. In some embodiments, method 600 may proceed to operation 614.

At operation 614, a processor may update the source for non-ATC utterances (e.g., aircraft, ground vehicles, etc.). The source of the non-ATC utterance may be determined from the atomic ATC action record. In an example embodiment, an NLU processing resulting in an atomic ATC action record may determine that a ground vehicle "Car-1" initiated a communication. In this example, the source may be updated from "Non-ATC" to "Car-1." In some embodiments, method 600 may proceed to operation 616. In this example embodiment, the ultimate ATC action record entered into the communications register could have information associated with the ATC utterance including, a source (e.g., ATC), a channel (e.g., Tower), the particular airport (e.g., KIAD), a timestamp, and the identity of the air traffic controller (e.g., John Doe), intent (e.g., runway crossing clearance), type (e.g., instruction), callsign (e.g., American 2784), runway (e.g., 19C), taxiway (e.g., Whiskey-2) and confidence score (e.g., 95). To continue the example of transcript "American two seven eight four at whiskey two cross 19C, taxi via yankee six there and hold short of taxiway yankee," in embodiments, this transcript may result in the definition of three atomic ATC records written to the communications register. Refer to FIG. 16 entries 4567, 4568,4569 for details of these entries. In embodiments, the atomic ATC action record entered into the communications register will have different information depending on the specific content of the transcript derived from the ATC utterance.

Figure 8:
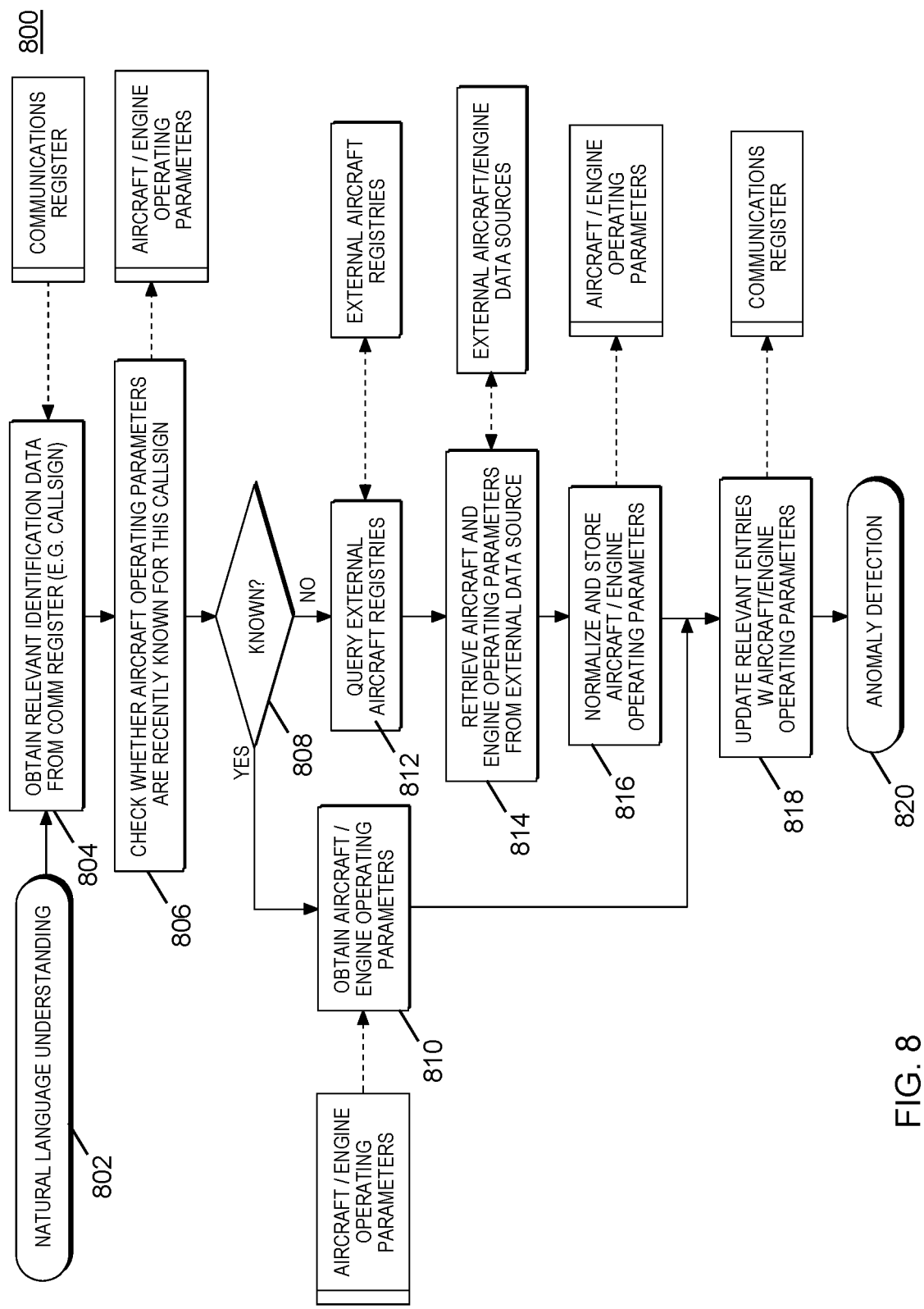
FIG. 8 illustrates a flowchart of a method for obtaining aircraft and engine operating parameters, in accordance with embodiments of the present disclosure.

At operation 616, a processor may optionally obtain aircraft and engine operating parameters as described in FIG. 8. In the case that aircraft and engine operating parameters are not obtained, the processor may proceed to anomaly detection as described by FIGS. 9A-9C. In some embodiments, the method 600 associated with NLU processing may end.

Figure 7:
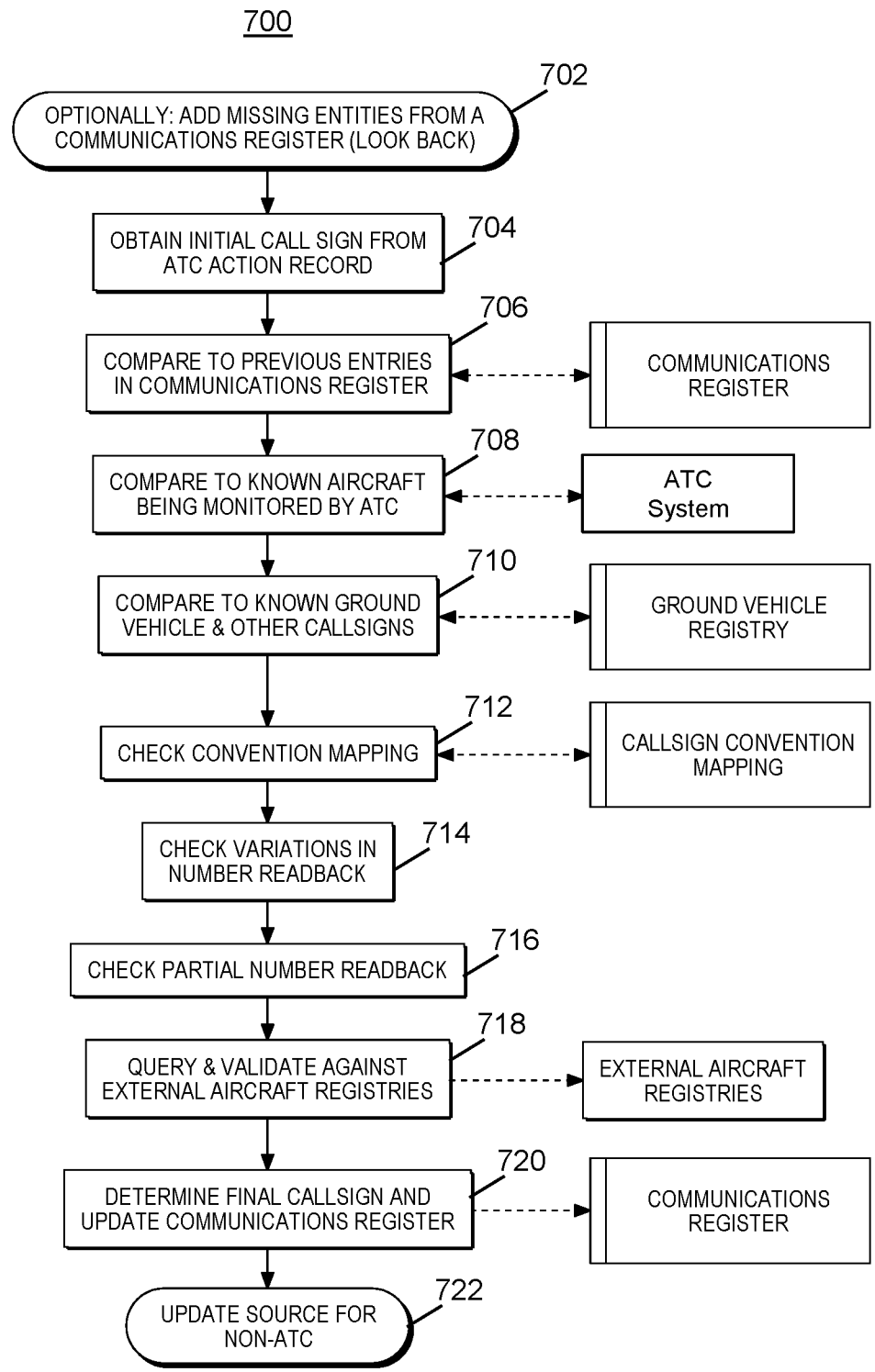
FIG. 7 illustrates a flowchart of a method for normalizing callsigns in ATC communications, in accordance with embodiments of the present disclosure.

Referring now to FIG. 7, a flowchart illustrating an example method 700 for callsign normalization, is depicted in accordance with embodiments of the present disclosure. Often, callsigns may uniquely identify the flight in an ATC communication and may be a key piece of data to be validated. In embodiments, the method 700 described herein, occurs during operation 612 of method 600. In some embodiments, the method 700 begins after operation 610 of method 600, depicted here as operation 702, where a processor may optionally add missing entities from a communications register (e.g., by looking back at historical entries in the communication register). In some embodiments, the method 700 begins after of method 600. In some embodiments, method 700 may proceed to operation 704.

At operation 704, a processor may obtain an initial callsign from an ATC action record. In some embodiments, a processor may update an initial callsign with each subsequent operation performed, though each operation (e.g., operation 704 through operation 720) is optional. In some embodiments, method 700 may proceed to operation 706.

At operation 706, a processor may compare the initial callsign to previous entries in the communication register. In an example embodiment, if a callsign for the currently processed atomic ATC action record is initially "American 28," but there is a history of recent communication with "American 1328," the action record may be updated to reflect the understanding that "American 1328" is the correct call sign. Such variation may occur due to the quality of communication channel and impact on NLP/NLU processing, or shorthand communications used by pilots. In some embodiments, the processor may update the communications register with the new call sign. In some embodiments, method 700 may proceed to operation 708.

At operation 708, a processor may compare the initial callsign to a known aircraft being monitored by the ATC. In some embodiments, a processor may receive known aircraft callsigns from the ATC system. In an example embodiment, if a callsign for the currently processed atomic ATC action record is initially "American 28," but the known aircraft callsigns retrieved from the ATC system include "American 1328," the action record may be updated to reflect the understanding that "American 1328" is the correct call sign.

In some embodiments, the processor may update the communications register with the new call sign. In some embodiments, method 700 may proceed to operation 710.

At operation 710, a processor may compare the initial callsign to known ground vehicles and other callsigns. In some embodiments, a processor may be configured to receive access to a ground vehicle registry. In an example embodiment, if a callsign for the currently processed atomic ATC action record is initially "Chief," but the known active ground vehicle callsigns retrieved from the ground vehicle registry include "Chief-2," the action record may be updated to reflect the understanding that "Chief-2" is the correct call sign. In some embodiments, the processor may update the communications register with the new call sign. In some embodiments, method 700 may proceed to operation 712.

At operation 712, a processor may check conventional mapping. In these embodiments, a processor may be configured to receive access to callsign convention mapping. In some embodiments, convention mapping may include validation against the phonetic alphabet used in aviation. In some embodiments, airlines may assign callsigns which do not correspond to the carrier flight number, for example, "British Airways 214" with a callsign "Speedbird 80 Golf Heavy." In an example embodiment, if a callsign for the currently processed atomic ATC action record is initially "British Airways 214," but the convention mapping retrieved indicates that this flight number has the callsign "Speedbird 80 Golf Heavy," the action record may be updated to reflect the understanding that "Speedbird 80 Golf Heavy" is the correct call sign. In some embodiments, the processor may update the communications register with the new call sign. In some embodiments, method 700 may proceed to operation 714.

At operation 714, a processor may check variations in number readbacks. For example, the callsign may be said in different ways, such as "American two-seven-eight-four," "American twenty seven-eighty four," or alternatively "American two-seven-eighty four." In an example embodiment, if a callsign for the currently processed atomic ATC action record is initially "American two-seven-eighty four," the action record may be updated to reflect the understanding that "American 2784" is the correct call sign. In some embodiments, the processor may update the communications register with the new call sign. In some embodiments, method 700 may proceed to operation 716.

At operation 716, a processor may check partial number readbacks. Partial call signs may be occasionally used to shorted ATC communications (e.g., "American 2784" vs. "84" vs. "784"). In an example embodiment, if a callsign for the currently processed atomic ATC action record is initially "American 84," the action record may be updated to reflect the understanding that "American 2784" is the correct call sign. In some embodiments, the processor may update the communications register with the new call sign. In some embodiments, method 700 may proceed to operation 718.

At operation 718, a processor may query and validate the callsign against external aircraft registries. In such embodiments, a processor may have access to one or more external aircraft registries that may be used to query and validate the callsign. In some embodiments, method 700 may proceed to operation 720.

At operation 720, a processor may be configured to determine a final callsign based upon the results of operations 704, 706, 708, 710, 712, 714, 716, and 718 and update the communication register. In some embodiments, method 700 may proceed to operation 722.

At operation 722, a processor may proceed to operation 614 of method 600 to update the source (e.g., aircraft) for a non-ATC source. In some embodiments, the method 700 associated with callsign normalization may end.

Referring now to FIG. 8, a flowchart illustrating an example method 800 for obtaining aircraft and engine operating parameters, is depicted in accordance with embodiments of the present disclosure. Obtaining aircraft and engine operating parameters may be useful during instances where an air traffic controller instructs an aircraft to perform flight maneuvers which exceed the capabilities of the aircraft (e.g., to fly to an altitude that exceeds the aircraft's capabilities). In some embodiments, the method 800 begins at operation 802 where a processor may perform NLU processing on transcripts of one or more ATC utterances as described in FIG. 6. In some embodiments, method 800 may proceed to operation 804.

At operation 804, a processor may obtain relevant identification data (e.g., aircraft callsign) from a communication register. In some embodiments, method 800 may proceed to operation 806.

At operation 806, a processor may query a local operating parameters database (e.g., a database of aircraft and engine operating parameters 118) to determine whether aircraft or engine operating parameters are recently known for the aircraft's callsign. In embodiments, a processor may query an aircraft and/or engine operating parameter external source. In some embodiments, a processor may not need to query external sources of information if the available information is current. In some embodiments, method 800 may proceed to operation step 808.

At operation 808, a processor determines if an aircraft and/or engine operating parameter is recently known. If a processor determines an operating parameter is recently known (decision branch "Yes"), method 800 may proceed to operation 810. At operation 810, a processor may obtain the aircraft and/or engine operating parameter from a local operating parameters database. In some embodiments, once the aircraft and/or engine operating parameter is obtained in operation 810, method 800 may proceed to operation 818. If a processor determines an operating parameter is not known (decision branch "No"), method 800 may proceed to operation 812. At operation 812, a processor may query external aircraft registries. In some embodiments, one or more external registries may be queried by a processor to validate the callsign as well as retrieve other information about the aircraft and engine type. In some embodiments, method 800 may proceed to operation 814.

At operation 814, a processor may retrieve aircraft and engine operating parameters form external data sources (e.g., manufacturing data sources). In some embodiments, method 800 may proceed to operation 816.

At operation 816, a processor may normalize and store aircraft and/or engine operating parameters (e.g., max speed, altitude, etc.). In embodiments, such information may be stored for future use in a database of aircraft and engine operating parameters 118. In some embodiments, method 800 may proceed to operation 818.

At operation 818, a processor may update relevant communication register entries with aircraft and/or engine operating parameters. In embodiments, a processor may update the relevant ATC action record in the communication register with aircraft and engine operating parameters. In other embodiments, a processor may store an aircraft and/or engine type while an operating parameter may be queried during anomaly detection if needed. In some embodiments, method 800 may proceed to operation 820.

At operation 820, a processor may proceed to anomaly detection. Anomaly detection may be referenced in more detail regarding FIGS. 9A-9C. In some embodiments, the method 800 associated with obtaining aircraft and/or engine operating parameters may end.

Figure 9A:
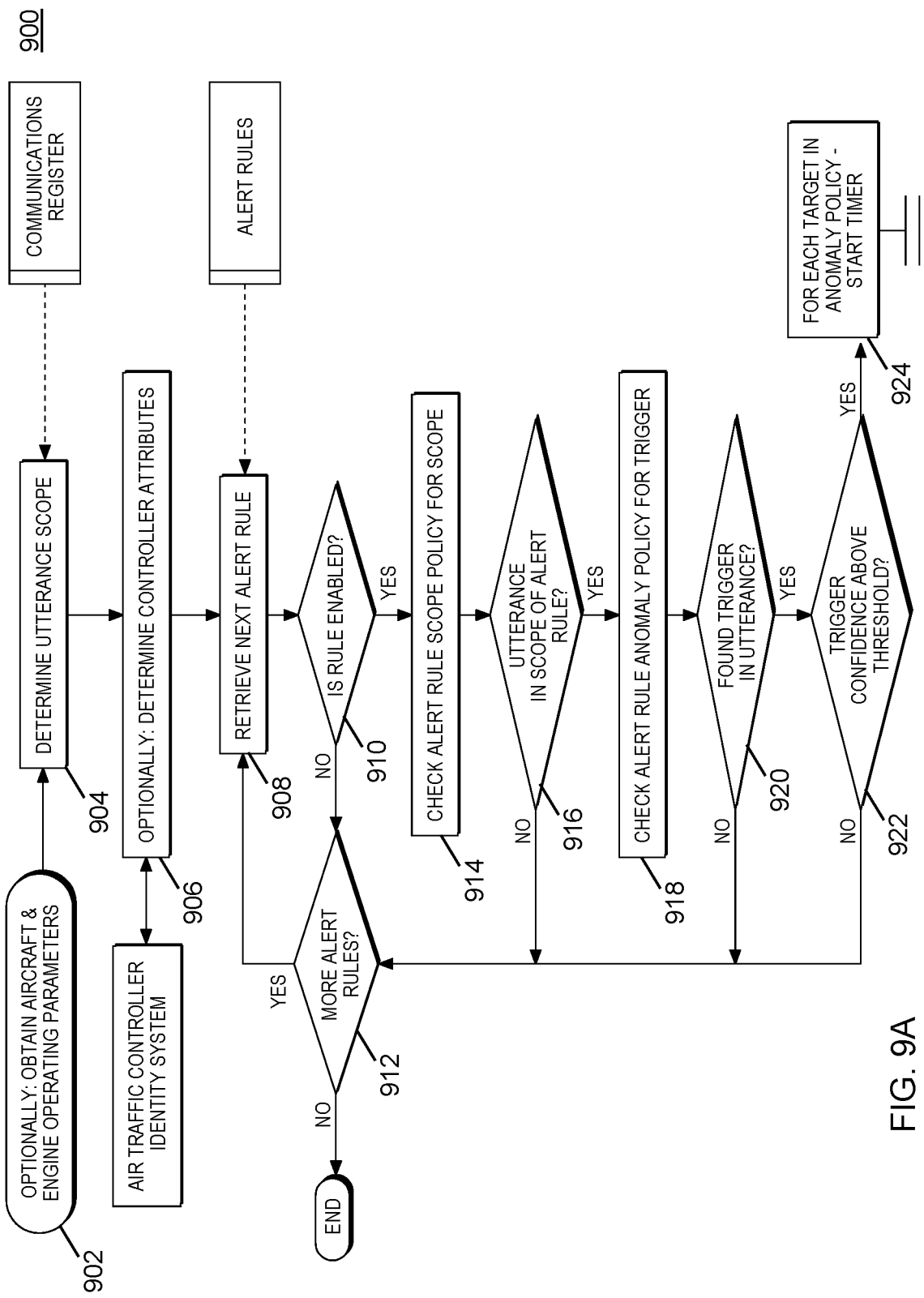
FIG. 9A illustrates a flowchart of a method for detecting anomalies in ATC communications, in accordance with embodiments of the present disclosure.

Referring now to FIG. 9A, a flowchart illustrating an example method 900 for detecting or identifying one or more anomalies in an ATC communication, is depicted in accordance with embodiments of the present disclosure. In some embodiments, the method 900 begins at operation 902 where a processor may optionally obtain aircraft and engine operating parameters as described in method 800 of FIG. 8. In some embodiments, method 900 may begin as a new ATC action record added to the communication register as described in method 600 of FIG. 6. In some embodiments, method 900 may proceed to operation 904.

At operation 904, a processor may determine the scope of the ATC utterance (e.g., the ATC action record stored in the communication register). In embodiments, a scope may include one or more of: a source (e.g., ATC, aircraft, ground vehicles, etc.), identity (e.g., air traffic controller identity), channel (e.g., tower, ground, apron, approach, etc.), and/or airport (e.g., IATA code, ICAO code, or other identifier). In some embodiments, method 900 may proceed to operation 906.

At operation 906, a processor may optionally identify additional attributes about the particular air traffic controller speaking the ATC utterance. In embodiments, a processor may access controller attributes from an air traffic controller identity system. In some embodiments, if the air traffic controller identity is available to a processor, a processor may further query to determine one or more air traffic controller attributes. In one example embodiment, a processor may determine and/or access attributes such as an air traffic controller's level of experience, certifications, trainee status, incident history and/or user preferences. In some embodiments, a processor may determine a particular air traffic controller has an elevated level of monitoring, while other air traffic controllers are excluded from the monitoring based on their attributes. In some embodiments, user preferences may allow for controllers to indicate how they prefer to be notified of an anomaly (for example, visual alarm, vibration, etc.). In some embodiments, method 900 may proceed to operation 908.

At operation 908, a processor may retrieve another alert rule. In embodiments, a processor may access one or more alert rules having one or more scope policy definitions, anomaly policy definitions, and/or response policy definitions. FIG. 14 illustrates a simplified table depicting one or more examples of an alert rule, in accordance with embodiments of the present disclosure. In some embodiments, method 900 may proceed to operation 910.

At operation 910, a processor may determine if another alert rule is enabled. If, at operation 910, a processor determines the alert rule is not enabled (decision branch "No"), a processor may proceed to operation 912. At operation 912, a processor may determine if more alert rules need evaluation. If, at operation 912, the processor determines more alert rules need evaluation (decision branch "Yes"), method 900 proceeds to operation 908. If, at operation 912, a processor determines no additional alert rules require evaluation, as depicted in FIG. 9A, method 900 may end. In some embodiments method 900 completely starts over. In embodiments, a processor may reinitiate the method 200 as depicted in FIG. 2 and the entire method may be restarted.

Returning to operation 910, if a processor determines that an alert rule is enabled (decision branch "Yes"), the method 900 proceeds to operation 914.

At operation 914, a processor may check the ATC utterance for scope based on a scope policy of an alert rule. FIG. 11 illustrates a simplified table depicting one or more examples of a scope policy, in accordance with embodiments of the present disclosure. In an example embodiment, the scope policy may define the scope to be utterances with a source of ATC or Aircraft, all controller identities, the communication channel for the Tower, for the KIAD airport. In some embodiments, method 900 may proceed to operation 916.

At operation 916, a processor may determine if an ATC utterance is within the scope of an alert rule. If a processor determines the ATC utterance is not within the scope of an alert rule (decision branch "No"), method 900 may proceed to operation 912. If a processor determines the ATC utterance is within the scope of an alert rule (decision branch "Yes"), method 900 may proceed to operation 918.

At operation 918, a processor may check the alert rule anomaly policy for a trigger rule. FIG. 12 illustrates a simplified set of tables depicting one or more examples of an anomaly policy that includes a trigger rule. In embodiments, the trigger rule is defined in the anomaly policy. In an example embodiment, a trigger rule may define that the utterance type is an instruction, and the utterance intent is a takeoff clearance. In some embodiments, method 900 may proceed to operation 920.

At operation 920, a processor determines if the elements defined by the trigger rule are within the ATC action record associated with the ATC utterance. In an example embodiment, the ATC action record is analyzed to determine whether the utterance type is an instruction and the utterance intent is a takeoff clearance. If a processor determines a potential trigger is not in the ATC action record (decision branch "No"), method 900 may proceed to operation 912. If a processor determines a potential trigger is in the ATC action record (decision branch "Yes"), method 900 may proceed to operation 922.

At operation 922, a processor may determine if the confidence score in the ATC action record is above the trigger's minimum confidence threshold. If a processor determines the ATC action record's confidence score is not above the trigger minimum confidence threshold (decision branch "No"), an active trigger is not identified, and method 900 may proceed to operation 912. If a processor determines the ATC action record's confidence score is above the trigger minimum confidence threshold (decision branch "Yes"), in some embodiments, a processor may identify an active trigger and a processor may begin looking for potential anomalies in the future. In these embodiments, a processor may base looking for future potential anomalies on targets defined in the anomaly policy. FIG. 12 illustrates a simplified set of tables depicting one or more examples of an anomaly policy that includes one or more examples of targets. Targets may include target rules, a utterance minimum confidence threshold, and a maximum time to look for the target. Target rules define the elements that the processor will look for within an ATC action record. In some embodiments, a processor may look back to prior entries in the communications register and may identify anomalies based on past ATC action records. Method 900 may proceed to operation 924.

At operation 924, a processor may start a timer for each target in the anomaly policy. In embodiments, each trigger may be associated with multiple targets. In such embodiments, multiple processes may be occurring in parallel to look for targets, based upon the associated target rules. While in some embodiments, the method 900 may end after operation 924, in other embodiments, method 900 continues (e.g., as referred to in more detail in FIGS. 9B and 9C).

Figure 9B:
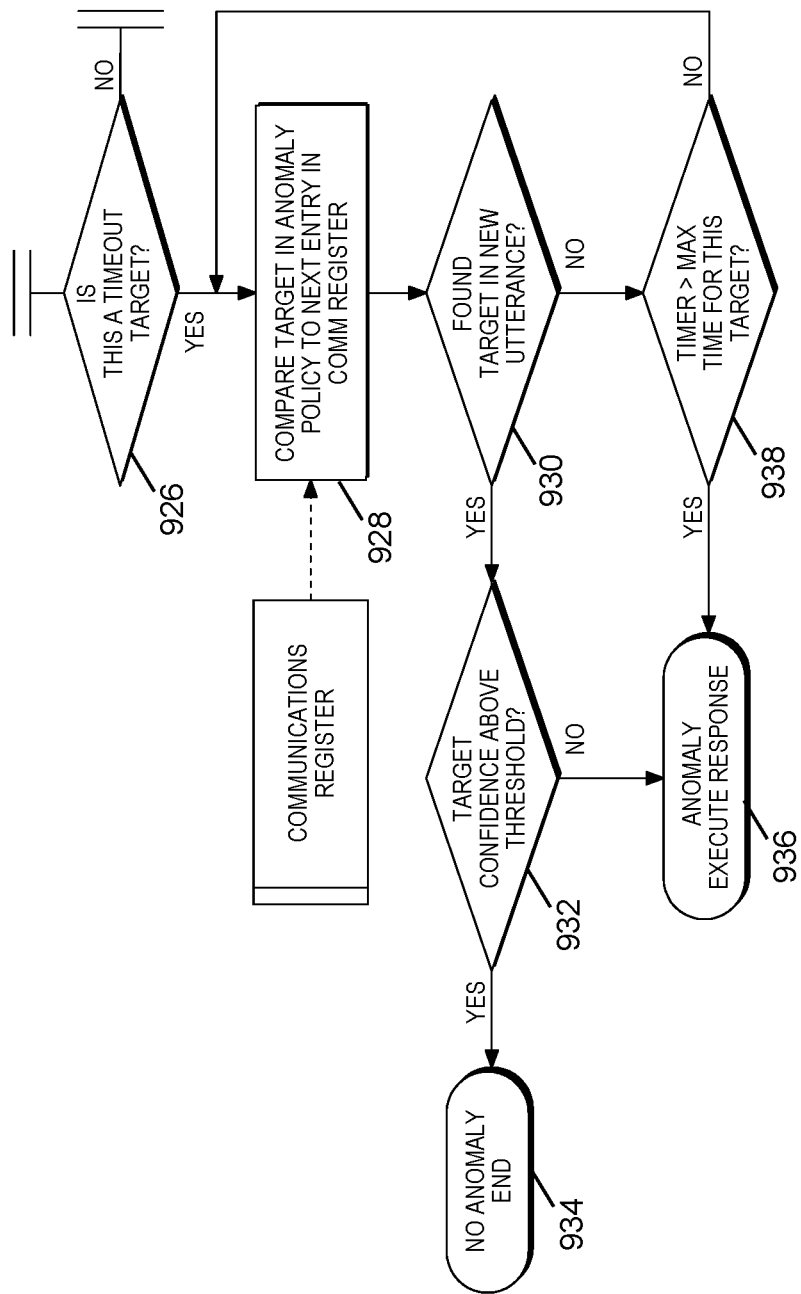
FIG. 9B illustrates a continuing flowchart of the method for detecting anomalies in ATC communications, in accordance with embodiments of the present disclosure.

Referring now to FIG. 9B, a flowchart illustrating possible continued operations associated with method 900 for detecting or identifying one or more anomalies in an ATC communication, is depicted in accordance with embodiments of the present disclosure. In some embodiments, the method 900 continues after operation 924. In some embodiments, method 900 may continue to operation 926.

Figure 9C:
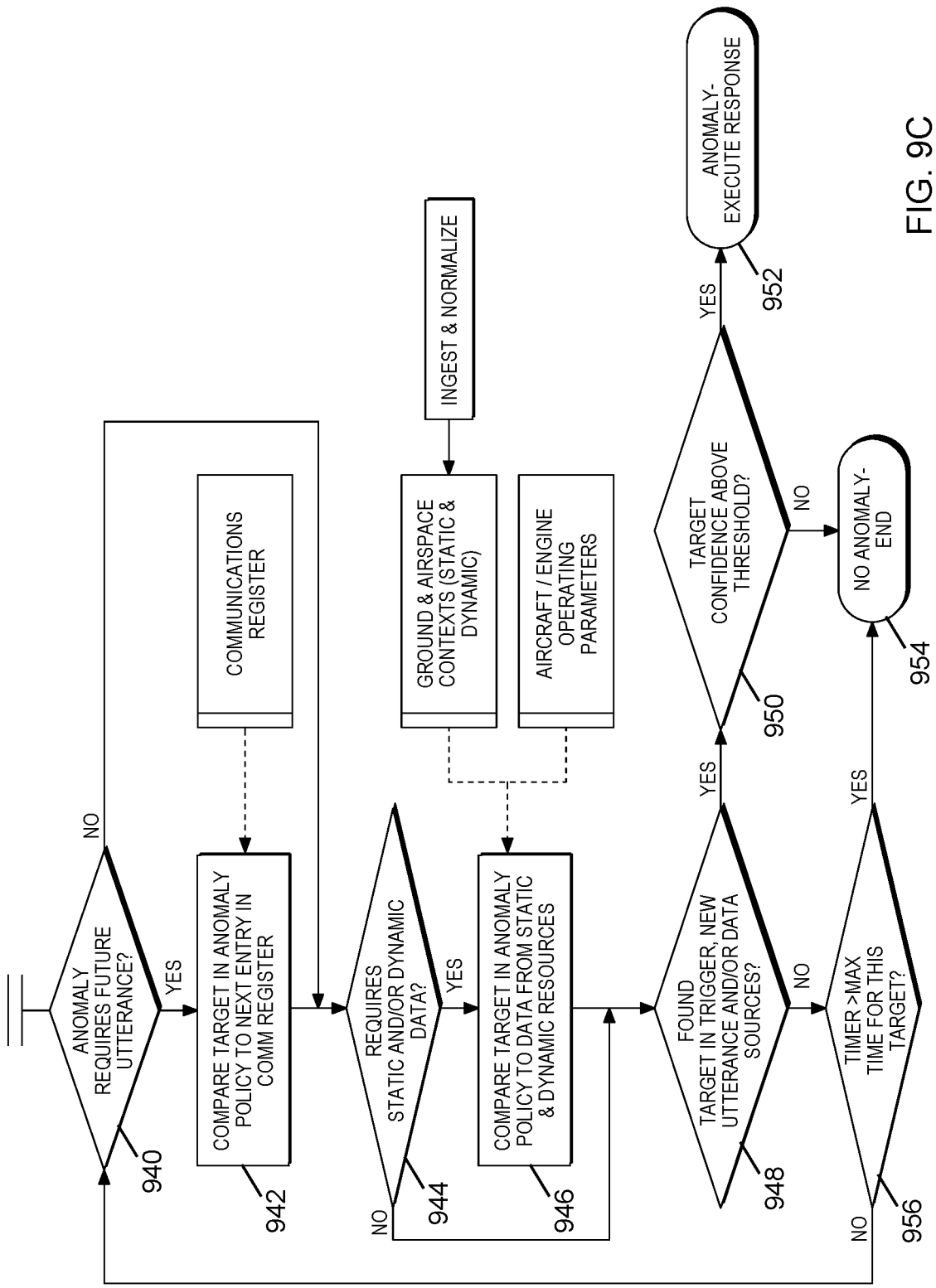
FIG. 9C illustrates a continuing flowchart of the method for detecting anomalies in ATC communications, in accordance with embodiments of the present disclosure.

At operation 926, a processor may determine if the target is a timeout target. Timeout targets can be used to identify anomalies where a target rule is not identified within an ATC action record within a defined time period. In one example embodiment, a timeout target may define a target rule that specifies that the type of communication as a readback, and the intent is a takeoff clearance. The target may specify a maximum time of 20 seconds. In this example embodiment, if the elements defined within the target rule are identified in a subsequent ATC action record within 20 seconds of the active trigger (e.g., the initial takeoff clearance instruction), then the target is found, and no anomaly occurs. Alternatively, if the elements defined within the target rule are not identified in a subsequent ATC action record within 20 seconds, the target is not found, and an anomaly occurs. If a processor determines the target is not a timeout target (decision branch "No"), method 900 may proceed to operation 940 as depicted in FIG. 9C. If a processor determines the target is a timeout target (decision branch "Yes"), method 900 may proceed to operation 928.

At operation 928, a processor may compare the target rule in the anomaly policy to the next entry in the communication register. In some embodiments, a processor may wait until a new entry appears in the communication register. In some embodiments, method 900 may proceed to operation 930.

At operation 930, a processor may determine if a potential target is found. In embodiments, a processor may determine if the elements defined by a target rule are found in a new ATC action record associated with an utterance. If, at operation 930, a processor determines a match is found (decision branch "Yes"), method 900 may proceed to operation 932. At operation 932 a processor may determine if the confidence score in the new ATC action record is above the target's minimum threshold.

If, at operation 932, a processor determines the ATC action record confidence score is above the target's minimum threshold (decision branch "Yes"), method 900 may proceed to operation 934. At operation 934, a processor may determine there is no anomaly in the ATC utterance. In embodiments where the processor determines there is no anomaly, the processor may have identified the expected target in the ATC utterance. In these embodiments, a processor may reinitiate the method 200 as depicted in FIG. 2 and may completely restart the whole process again. If, at operation 932, a processor determines the ATC action record confidence score is not above the target's minimum threshold (decision branch "No"), method 900 may proceed to operation 936.

At operation 936, a processor may execute an anomaly response (e.g., in response to identifying an anomaly). In some embodiments, a processor may execute different anomaly responses. In these embodiments, a processor may execute an anomaly response based, at least in part on confidence score ranges of the trigger and/or target. In some embodiments, a processor may base an overall confidence score decision on the combination of trigger and target confidence scores. At operation 936, the processor may proceed to the method 1000 for execution of an anomaly response is detailed in FIG. 10.

Returning to operation 930, if a processor determines that the elements defined by a target rule are not found in a new ATC action record associated with an utterance (decision branch "No"), method 900 may proceed to operation 938. At operation 938, a processor may determine if the time passed, as determined by a timer (e.g., operation 924 in FIG. 9A) exceeds a maximum allotted time for the target. In some embodiments, a maximum allotted time for timeout anomaly policies may specify the maximum period of time a processor will monitor for the target. If, at operation 938, a processor determines the time passed does not exceed a maximum allotted time (decision branch "No"), method 900 may proceed to operation 928. If, at operation 938, a processor determines the time passed has exceeded a maximum allotted time (decision branch "Yes"), method 900 may proceed to operation 936. In embodiments where a processor determines a target is not received before the timer reaches the maximum allotted time, a processor may determine that this is an indication of an anomaly. For example, if a readback to an ATC instruction (e.g., target) is not received within 30 seconds (e.g., maximum allotted time) of the original instruction (e.g., the active trigger), a processor may determine that this is an anomaly and execute a response. In some embodiments, the maximum allotted time may be a dynamic value determined by a processor. In these embodiments, a processor may dynamically adjust the maximum allotted time based on the operating parameters of the engine and/or aircraft. For example, a processor may calculate an expected time an aircraft may need to taxi or takeoff and how much the time may vary based on the type of aircraft (e.g., differences between a standard aircraft and a jet). At operation 936, the processor may proceed to the method 1000 for execution of an anomaly response is detailed in FIG. 10. In some embodiments, method 900 may end after operation 936 or after operation 934.

Referring now to FIG. 9C, a flowchart illustrating possible continued operations associated with method 900 for detecting or identifying one or more anomalies in an ATC communication, is depicted in accordance with embodiments of the present disclosure. In some embodiments, the method 900 continues after operation 926 (See FIG. 9B). In some embodiments, a processor may identify an anomaly if the target occurs in the future. In some embodiments, as shown in FIG. 12, a processor may identify multiple targets associated with a single anomaly policy that that includes a trigger rule. In an example embodiment, a trigger rule may define that the utterance type is an instruction, and the utterance intent is a takeoff clearance. In this example embodiment, the targets that may occur in the future that indicate an anomaly include a runway crossing clearance on the same runway (e.g., FIG. 12, Target 5), a landing clearance on the same runway (e.g., FIG. 12, Target 6), a landing clearance on an intersecting runway (e.g., FIG. 12, Target 7), a landing clearance on the same physical surface with different runway number (e.g., FIG. 12, Target 8). In some embodiments, trigger rules or target rules may include queries to static and dynamic ground context information 114, static and dynamic airspace context information 116, and/or a database of aircraft and engine operating parameters 118 of communication system 100. In example embodiments, this would allow the target rules to determine if a takeoff clearance is given for a closed runway, an intersecting runway, or the same physical surface, etc. If, at operation 926, a processor determines the target is not a timeout target (decision branch "No"), a processor may proceed to operation 940.

At operation 940, a processor may determine if identification of the anomaly defined by the anomaly policy (including a trigger rule) requires a future ATC utterance. In embodiments, the anomaly policy may define one or more targets, each of which includes a target rule, a target minimum confidence threshold, and a maximum time to look for the target. In embodiments, a processor may identify a target through a future entry in a communication register. If, at operation 940, a processor determines an anomaly requires a future ATC utterance (decision branch "Yes"), method 900 may proceed to operation 942. At operation 942, a processor may compare a target, including the associated target rule, in the anomaly policy to the next entry in the communication register (e.g., an ATC action record). If the target rule is matches against the ATC action record in the communication register, this may indicate an anomaly has occurred. In an example embodiment, as shown in FIG. 12, an anomaly policy that specifies a trigger rule where the trigger utterance type is an instruction, and the trigger utterance intent is a takeoff clearance, may have a target that specifies a target rule that looks for a future ATC action record in the communication register where the target utterance type is an instruction, and the target utterance intent is a runway crossing clearance. In some embodiments, after operation 942 method 900 may proceed to operation 944. Returning to operation 940, if a processor determines that detection of the anomaly defined by the anomaly policy does not require a future ATC utterance (decision branch "No"), method 900 may proceed to operation 944.

At operation 944, a processor may determine if static and/or dynamic data is required in order to identify an anomaly (e.g., from static and dynamic ground context information 114, static and dynamic airspace context information 116, and/or a database of aircraft and engine operating parameters 118 of communication system 100). In some embodiments, a processor may require both future audio and data from static and/or dynamic sources to identify an anomaly. For example, "cleared for takeoff" followed by "cleared for landing" on the same physical runway surface but from opposite direction may require a processor to understand that runway "35L" and "17R" correspond to the same physical surface and not two different runway numbers.

If, at operation 944, a processor determines static and/or dynamic data is required (decision branch "Yes"), method 900 may proceed to operation 946. At operation 946, a processor may compare a target, and its associated target rule, in the anomaly policy to data from static and dynamic sources. In some embodiments, a processor may receive access to aircraft and engine operating parameters, and ground and airspace context information. In these embodiments, a processor may be configured to ingest and normalize one or more pieces of raw static and/or dynamic data sources. For example, raw static and dynamic data sources may include one or more of the following: airport static ground context information (e.g., runway crossings, taxiways, gates), airport dynamic ground context information (e.g., runway/taxiway closures, NOTAMs, METAR/SPECI), static airspace context information (e.g., terrain, waypoints, published approaches and departures), dynamic airspace context information (e.g., NOTAMs, TFRs, notices, METAR/SPECI, advisories), and convention corpus (e.g., global, national, or local conventions), and communication standard sequence mapping (e.g., normal order of ATC communication sequences). In some embodiments, method 900 may proceed to operation 948.

If, at operation 944, a processor determines static and/or dynamic data is not required to detect an anomaly (decision branch "No"), method 900 may proceed to operation 948.

At operation 948, a processor may determine if a potential target is found. In embodiments, a processor may determine if the elements defined by a target rule are found in a new ATC action record associated with an utterance (e.g., an action record from the communication register) and/or data sources. In an example embodiment that queries a data source, a processor could use the runway number and the current time to determine the status of the runway as indicated by dynamic data sources. In embodiments, a target rule may query data sources with entities from the active trigger (e.g., a runway or taxiway). In some embodiments, a processor may identify some targets in the entities stored in the triggering ATC action record. For example, if an active trigger occurs because the intent of an ATC utterance is "mayday," in an embodiment, no future ATC utterance or queries to data sources are required, and the target intent of "mayday" may be identified directly from the triggering ATC action record. In some embodiments, a processor could determine whether an ATC instruction (e.g., climb to a given altitude) is acceptable within the previously obtained aircraft and/or engine operating specifications that are stored with the triggering ATC action record.

If, at operation 948, a processor determines a match is found (decision branch "Yes"), method 900 may proceed to operation 950. At operation 950, a processor may determine if the confidence score in the new ATC action record is above the target's minimum threshold. If, at operation 950, a processor determines the ATC action record confidence score is above the target's minimum threshold (decision step "Yes"), method 900 may proceed to operation 952. In embodiments, a confidence score check may not be necessary (e.g., the target does not require an utterance, but only checks against data sources). In such embodiments, the method 900 may proceed to operation 952. At operation 952, a processor may identify an anomaly and execute an anomaly response. In some embodiments, a processor may execute different anomaly responses based on confidence score ranges of the trigger and/or target. In other embodiments, a processor may base the execution of the anomaly response on the combination of the trigger and target confidence score. At operation 952, the processor may proceed to the method 1000 for execution of an anomaly response is detailed in FIG. 10.

If, at operation 950, a processor determines the new ATC action record does not have a confidence score above the target's minimum threshold (decision branch "No"), method 900 may proceed to operation 954. At operation 954, a processor may determine there is no anomaly, and may reinitiate the reinitiate the method 200 as depicted in FIG. 2.

Returning to operation 948, a processor may determine that a target is not found. In embodiments, the processor may not identify some targets in the entities stored in the triggering ATC action record, in the elements defined by a target rule in a new ATC action record associated with an utterance, and/or from data sources (decision branch "No"). If at operation 948 a processor determines that a target is not found, a method 900 may proceed to operation 956.

At operation 956, a processor may determine if the time passed, as determined by a timer (e.g., operation 924 in FIG. 9A) exceeds a maximum allotted time for the target. If, at operation 956, a processor determines the time has not exceeded a maximum allotted time for the particular target (decision branch "No"), method 900 may proceed to operation 940. If, at operation 956, a processor determines the time has exceeded a maximum allotted time for the particular target (decision branch "Yes"), method 900 may proceed to operation 954. In embodiments where a processor determines a target is not received before the timer reaches the maximum allotted time, a processor may determine that no anomaly occurs for this potential target. For example, if a runway crossing clearance instruction (e.g., target) is not received within 120 seconds (e.g., maximum allotted time) of a takeoff clearance instruction (e.g., the active trigger) on the same runway, a processor may determine that no anomaly occurs for this target. In some embodiments, the maximum allotted time may be a dynamic value determined by a processor. In these embodiments, a processor may dynamically adjust the maximum allotted time based on the operating parameters of the engine and/or aircraft. For example, a processor may calculate an expected time an aircraft may need to taxi or takeoff and how much the time may vary based on the type of aircraft (e.g., differences between a standard aircraft and a jet). At operation 954, the processor may reinitiate the method 200 as depicted in FIG. 2. In some embodiments, after operation 954 or operation 952, method 900 associated with anomaly detection may end.

Figure 10:
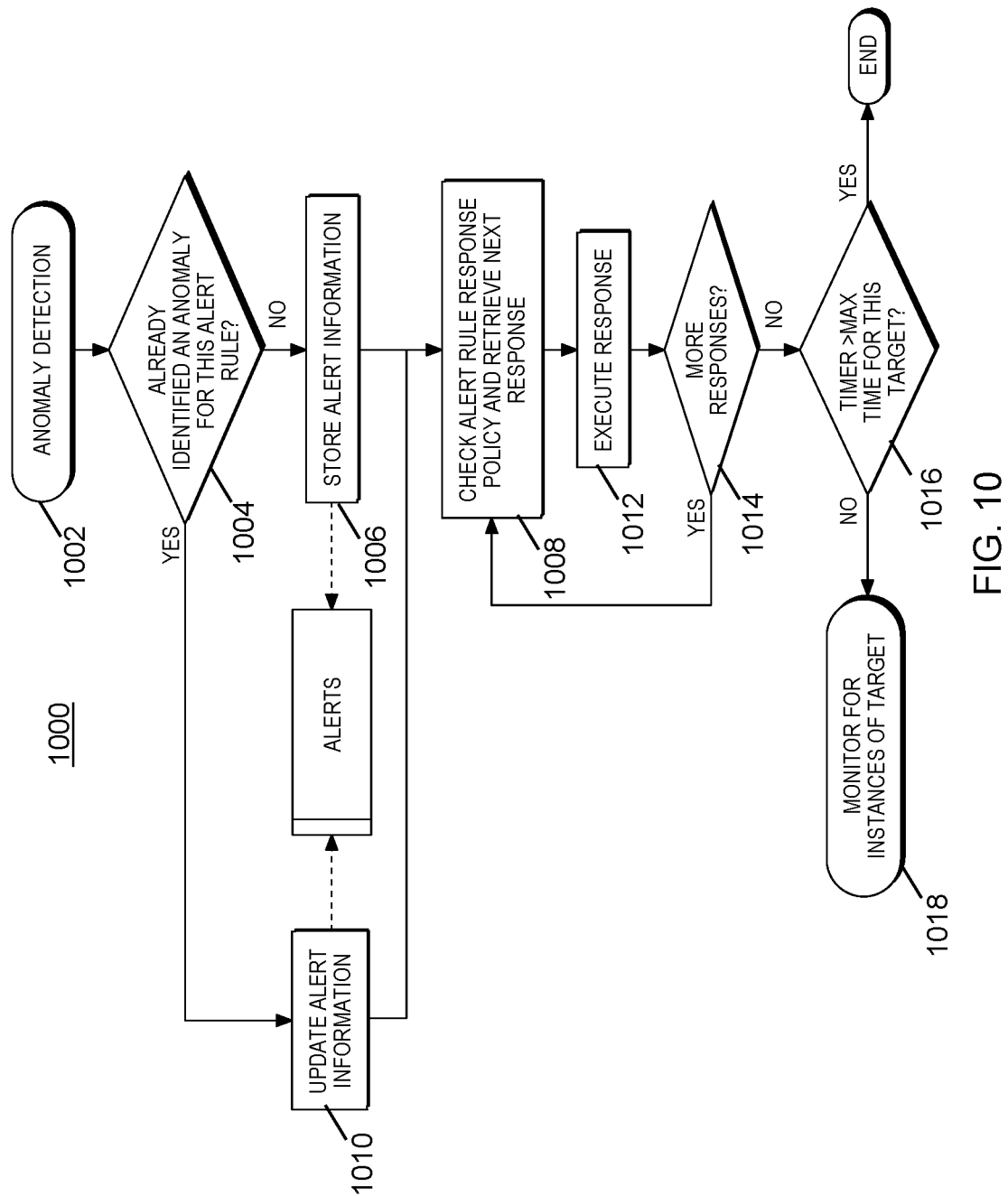
FIG. 10 illustrates a flowchart of a method for executing a response, in accordance with embodiments of the present disclosure.

Referring now to FIG. 10, a flowchart illustrating an example method 1000 for executing an anomaly response, is depicted in accordance with embodiments of the present disclosure. In some embodiments, the method 1000 begins at operation 1002 where a processor has detected an anomaly, as indicated by operational step 936 of method 900 in FIG. 9B, or operational step 952 of method 900 in FIG. 9C. In some embodiments, method 1000 may proceed to operation 1004.

At operation 1004, a processor may determine if an anomaly has already been identified for the particular alert rule. If the processor determines an anomaly has not already been identified for the particular alert rule (decision branch "No"), method 1000 may proceed to operation 1006. At operation 1006 a processor may store alert information. In some embodiments, method 1000 proceeds to operation 1008. If the processor determines an anomaly has already been identified for the particular alert rule (decision branch "Yes"), method 1000 may proceed to operation 1010. At operation 1010, a processor may update already existing alert information. In some embodiments, a processor may repeat one or more response actions if more instances of the anomaly are identified for this alert rule. In some embodiments, a processor may repeat response actions based on user preferences. In some embodiments, method 1000 may proceed to operation 1008.

At operation 1008, a processor may check an alert rule response policy and retrieve the next response. FIG. 13 illustrates a simplified table depicting one or more examples of a response policy, and FIG. 14 illustrates a simplified table depicting one or more examples of an alert rule, in accordance with embodiments of the present disclosure. In some embodiments, an alert rule may be retrieved during previous operations. In some embodiments, method 1000 may proceed to operation 1012.

At operation 1012, a processor may execute a response. In embodiments, a processor may execute one or more responses to an air traffic controller, an ATC supervisor, aircraft, ground vehicles, or other stakeholders in the communication system. In embodiments, a response may include, but is not limited to, a vibration alarm, haptic alarm, screen/visual alarm, audible alarm, logging server, chat server, email or mobile message, aircraft message, and ground vehicle message. In some embodiments, method 1000 proceeds to operation 1014.

At operation 1014, a processor may determine if more responses need to be executed. If a processor determines more responses need to be executed (decision branch "Yes"), method 1000 proceeds to operation 1008. If a processor determines no additional responses need to be executed (decision branch "No"), method 1000 may proceed to operation 1016.

At operation 1016, a processor may determine if the timer exceeds a maximum allotted time for the particular target that initiated the anomaly response, in operation 936 of method 900 in FIG. 9B or operation 952 of method 900 in FIG. 9C. If a processor determines the timer does not exceed the maximum allotted time for the particular target (decision branch "No"), method 1000 may proceed to operation 1018. At operation 1018, a processor may monitor for instances of the target and may resume the anomaly detection process at operational step 926 of method 900 in FIG. 9B. If a processor determines the timer does exceed the maximum allotted time for the particular target (decision branch "Yes"), method 1000 may proceed to operation 1020. In some embodiments, at operation 1020 method 1000 may end. In these embodiments, a processor may continue processing monitoring for one or more other targets that this particular alert rule may be executing. In embodiments, a processor may reinitiate the method 200 as depicted in FIG. 2.

Referring now to FIG. 11, block diagram 1100 depicts an example scope policy is depicted in accordance with embodiments of the present disclosure. FIG. 11 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, a scope policy may include a combination of one or more source (e.g., ATC, aircraft, ground vehicle, other), identity (e.g., air traffic controller identity), channel (e.g., tower, ground, apron, approach, etc.), and airport (e.g., IATA code, ICAO code, or other unique identifier). In some embodiments, a scope policy may be associated with a single airport, while in other embodiments, the scope policy may be used for multiple airports that are proximate to each other or centrally located among a large number of airports.

Referring now to FIG. 12, block diagram 1200 depicts an example anomaly policy and example targets, is depicted in accordance with embodiments of the present disclosure. FIG. 12 provides an illustration of only one implementation and does not imply any limitations with regard to the environments in which different embodiments may be implemented. Many modifications to the depicted environment may be made by those skilled in the art without departing from the scope of the invention as recited by the claims. In embodiments, an anomaly policy may include an anomaly identifier, an anomaly name, an anomaly type, an anomaly description, a trigger rule, a minimum confidence threshold associated with the trigger detected in the ATC utterance, and target identifiers. In embodiments, target identifiers may direct a processor to the target name, the particular target rule, a minimum confidence threshold associated with the target detected in the ATC utterance, the maximum time (e.g., associated with a timer), and whether the target is a timeout target. In some embodiments, a processor may query static and/or dynamic data sources to process trigger rules and/or target rules.

Referring now to FIG. 13, block diagram 1300 depicts an example response policy is depicted in accordance with embodiments of the present disclosure. FIG. 13 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, a response policy may provide a processor with information including, a response policy identifier, the name of the response policy, whether to send an alert to an audible controller alarm, whether to send an alert to an audible supervisor alarm, whether to send an alert to is an visible controller alarm (e.g., screen or visual alarm), whether to send an alert to an visible supervisor alarm (e.g., screen or visual alarm), whether to send an alert to an email alarm and the information associated with an email alarm, whether to send an alert to a vibration alarm, whether to send an alert to a haptic alarm, whether to send an alert to an aircraft, and where information associated with the response can be logged.

Referring now to FIG. 14, block diagram 1400 depicts an example alert rule is depicted in accordance with embodiments of the present disclosure. FIG. 14 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, an alert rule may provide a processor with information associated with an alert rule identifier, an alert rule name, whether the alert rule is enabled, what scope policy is included in the alert rule, what anomaly policy is included in the alert rule, and what response policy is included in the alert rule. In some embodiments, an alert rule may be comprised of a single scope policy, anomaly policy, and response policy. In some embodiments, an alert rule may include allowing for the inclusion of multiple scope policies, anomaly policies, and response policies within a single alert rule. In these embodiments, the resulting policy may be a combination of the individually specified policies. In some embodiments, an alert rule may include allowing for the use of types, groups, or categories of entities (e.g., predefining which anomaly policies together form a group, and specifying the group identifier). In some embodiments, wildcards or regular expressions may be used. For example, use of all anomaly policies with "runway" in the anomaly name may be used.

Referring now to FIGS. 15A-15D, block diagram 1500 depicts example anomaly types and anomaly inputs in accordance with embodiments of the present disclosure. FIG. 15 provides an illustration of only one implementation and does not imply any limitations with regard to the environments in which different embodiments may be implemented. Many modifications to the depicted environment may be made by those skilled in the art without departing from the scope of the invention as recited by the claims.

While FIGS. 15A-15D depict a variety of anomaly types and inputs, the provided examples are not meant to be exhaustive and is only intended to be representative of anomaly types as contemplated herein. In embodiments, a processor may have access to anomaly identifiers, anomaly types, anomaly triggers, anomaly targets, and static and dynamic data sources.

Referring now to FIG. 16, block diagram 1600 depicts an example communication register in accordance with embodiments of the present disclosure. FIG. 16 provides an illustration of only one implementation and does not imply any limitations with regard to the environments in which different embodiments may be implemented. Many modifications to the depicted environment may be made by those skilled in the art without departing from the scope of the invention as recited by the claims. In embodiments, each entry in a communication register is an atomic ATC action record. In embodiments, a communication register may include, an ATC utterance identifier, source, speaker identity, channel, airport, communication type, intent of the ATC utterance, aircraft callsign, runway, taxiway, timestamp, and confidence score. In embodiments, the communication register may also store the audio recording associated with each atomic ATC action record.

Referring now to FIG. 17, block diagram 1700 depicts an example ground and airspace context database in accordance with embodiments of the present disclosure. FIG. 17 provides an illustration of only one implementation and does not imply any limitations with regard to the environments in which different embodiments may be implemented. Many modifications to the depicted environment may be made by those skilled in the art without departing from the scope of the invention as recited by the claims. In embodiments, a ground and airspace context database may include, information identifier, airport location, object type, object identifier, object start, object end, object status, start date, start time, end date, end time, source type, source references. In embodiments, as part of method 900, a processor may ingest and normalize raw ground and airspace data sources for storage in a ground and airspace context database. In these embodiments, a processor may have knowledge of shorthand information, codes, or other references used in data sources. In one example, a notice to airmen (NOTAM) for taxiway closure such as "!JFK 12/188 (KJFK A9374/19) JFK TWY C BTN TWY C2 AND TWY V CLSD 1912051637-2002140901" may be stored in the ground and airspace context database as shown in the first entry of FIG. 17 (ID 1). In another embodiment, a single raw data source (e.g., NOTAM, METAR entry) may be normalized into multiple entries in the ground and airspace context database (for example, when a single NOTAM entry references two runways that are closed).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18A:
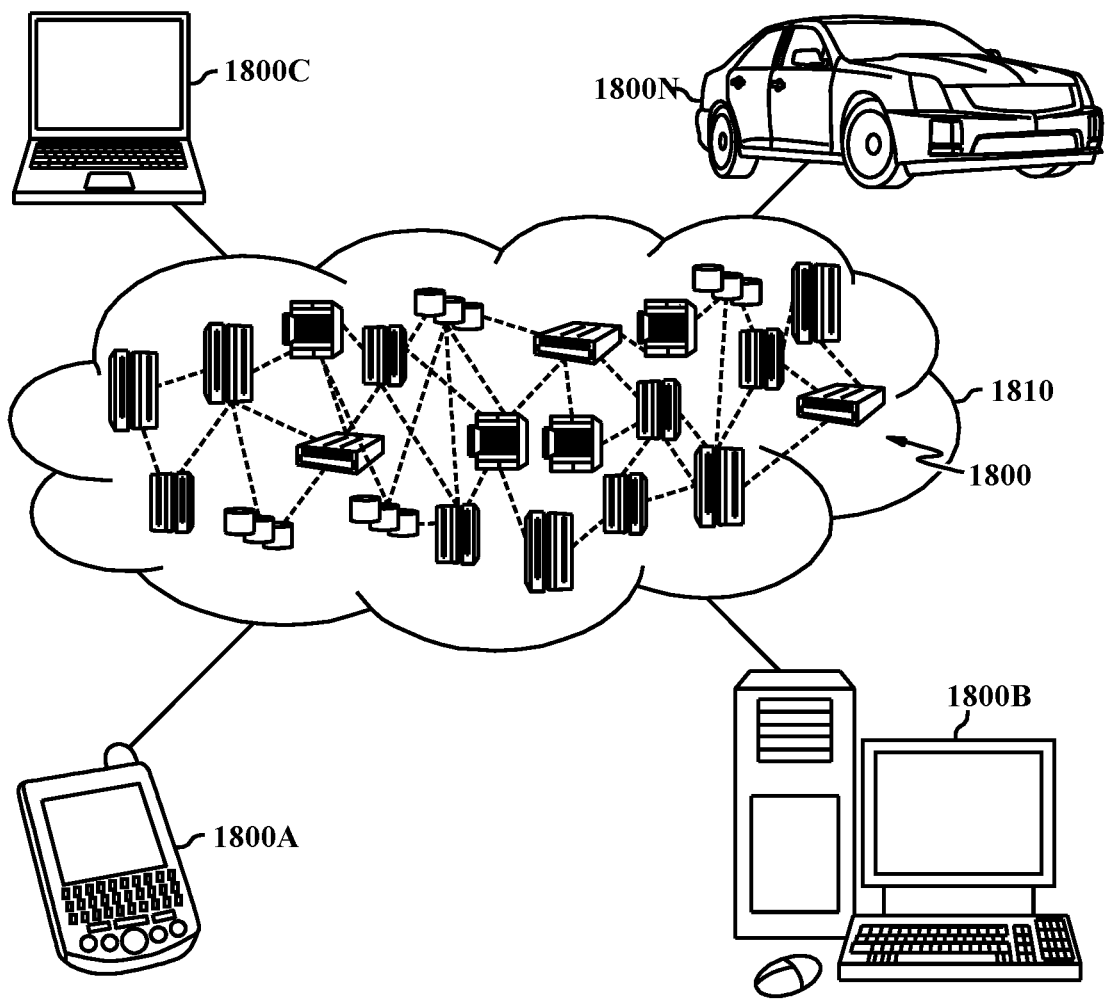
FIG. 18A illustrates a cloud computing environment, in accordance with embodiments of the present disclosure.

Referring now to FIG. 18A, illustrative cloud computing environment 1810 is depicted. As shown, cloud computing environment 1810 includes one or more cloud computing nodes 1800 with which local computing devices used by cloud consumers, such as, for example, personal digital assistant (PDA) or cellular telephone 1800A, desktop computer 1800B, laptop computer 1800C, and/or automobile computer system 1800N may communicate. Nodes 1800 may communicate with one another. They may be grouped (not shown) physically or virtually, in one or more networks, such as Private, Community, Public, or Hybrid clouds as described hereinabove, or a combination thereof. This allows cloud computing environment 1810 to offer infrastructure, platforms and/or software as services for which a cloud consumer does not need to maintain resources on a local computing device. It is understood that the types of computing devices 1800A-N shown in FIG. 18A are intended to be illustrative only and that computing nodes 1800 and cloud computing 1800 and cloud computing environment 1810 can communicate with any type of computerized device over any type of network and/or network addressable connection (e.g., using a web browser).

Figure 18B:
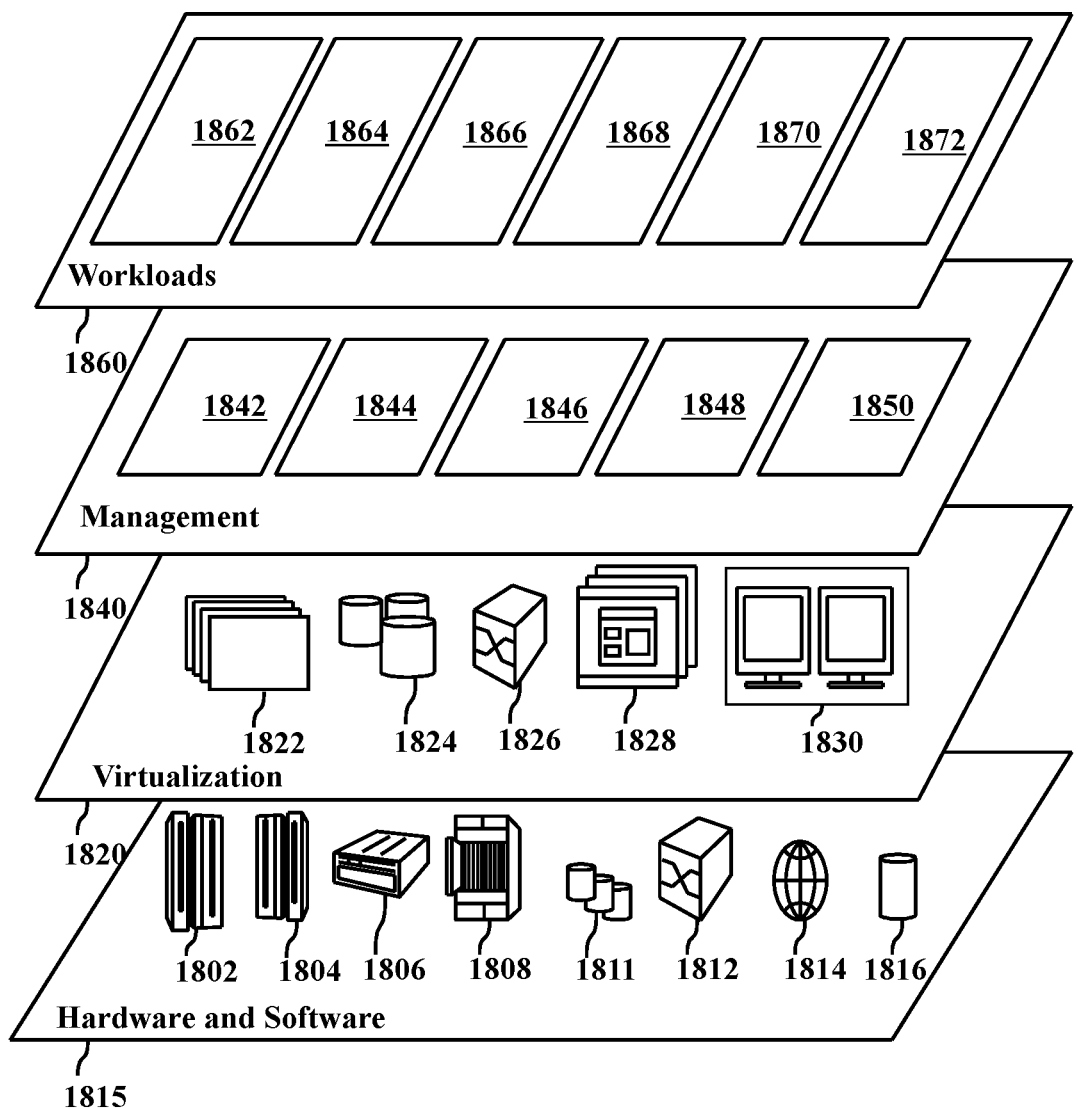
FIG. 18B illustrates abstraction model layers, in accordance with embodiments of the present disclosure.

Referring now to FIG. 18B, a set of functional abstraction layers provided by cloud computing environment 1810 (FIG. 18A) is shown. It should be understood in advance that the components, layers, and functions shown in FIG. 18B are intended to be illustrative only and embodiments of the disclosure are not limited thereto. As depicted below, the following layers and corresponding functions are provided.

Hardware and software layer 18118 includes hardware and software components. Examples of hardware components include: mainframes 1802; RISC (Reduced Instruction Set Computer) architecture based servers 1804; servers 1806; blade servers 1808; storage devices 1811; and networks and networking components 1812. In some embodiments, software components include network application server software 1814 and database software 1816.

Virtualization layer 1820 provides an abstraction layer from which the following examples of virtual entities may be provided: virtual servers 1822; virtual storage 1824; virtual networks 1826, including virtual private networks; virtual applications and operating systems 1828; and virtual clients 1830.

In one example, management layer 1840 may provide the functions described below. Resource provisioning 1842 provides dynamic procurement of computing resources and other resources that are utilized to perform tasks within the cloud computing environment. Metering and Pricing 1844 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1846 provides access to the cloud computing environment for consumers and system administrators. Service level management 1848 provides cloud computing resource allocation and management such that required service levels are met. Service Level Agreement (SLA) planning and fulfillment 1850 provide pre-arrangement for, and procurement of, cloud computing resources for which a future requirement is anticipated in accordance with an SLA.

Workloads layer 1860 provides examples of functionality for which the cloud computing environment may be utilized. Examples of workloads and functions which may be provided from this layer include: mapping and navigation 1862; software development and lifecycle management 1864; virtual classroom education delivery 1866; data analytics processing 1868; transaction processing 1870; and anomaly identification 1872.

Figure 19:
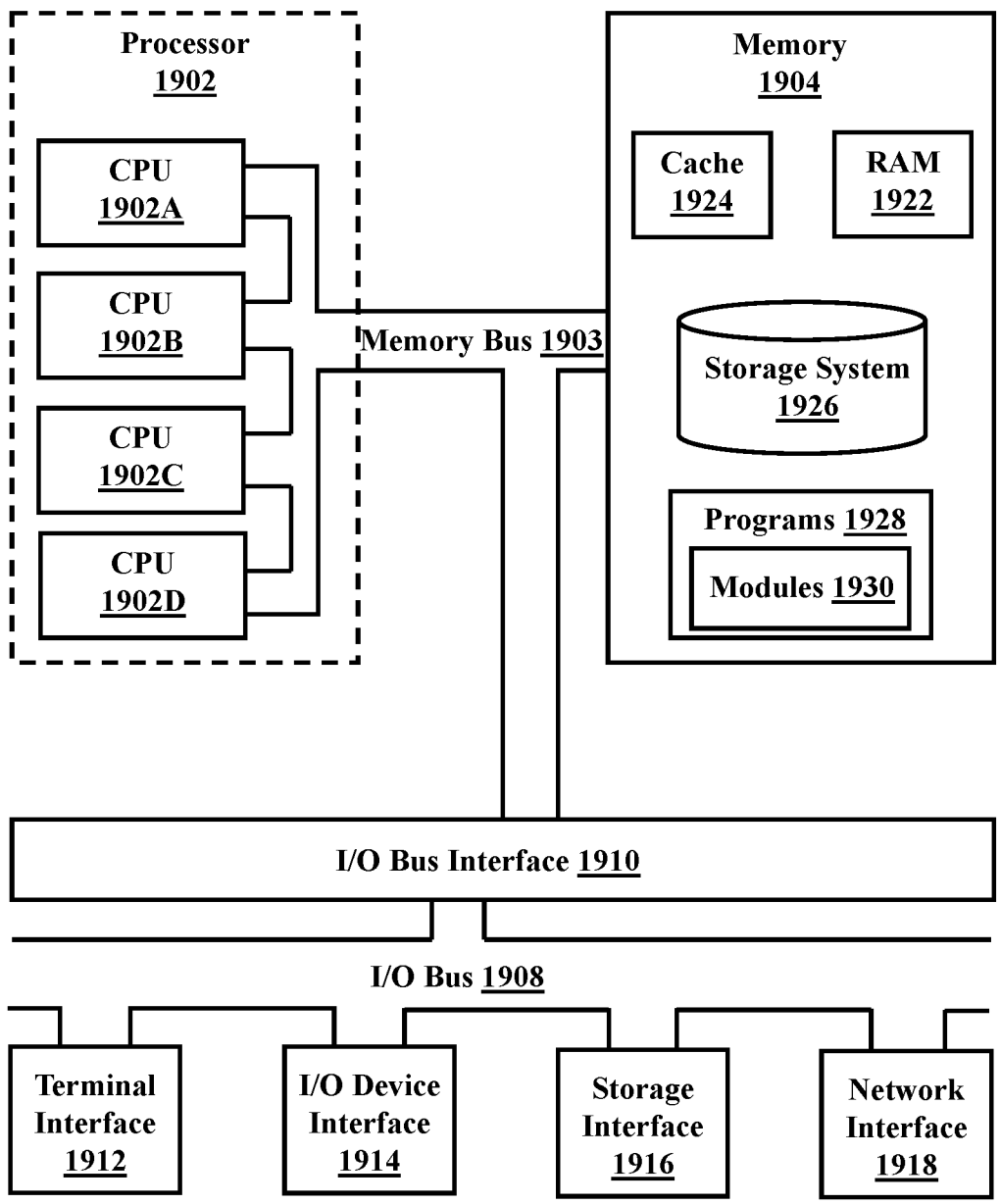
FIG. 19 illustrates a high-level block diagram of an example computer system that may be used in implementing one or more of the methods, tools, and modules, and any related functions, described herein, in accordance with embodiments of the present disclosure.

FIG. 19, illustrated is a high-level block diagram of an example computer system 1900 that may be used in implementing one or more of the methods, tools, and modules, and any related functions, described herein (e.g., using one or more processor circuits or computer processors of the computer), in accordance with embodiments of the present invention. In some embodiments, the major components of the computer system 1900 may comprise one or more Processor 1902, a memory subsystem 1904, a terminal interface 1912, a storage interface 1916, an I/O (Input/Output) device interface 1914, and a network interface 1918, all of which may be communicatively coupled, directly or indirectly, for inter-component communication via a memory bus 1903, an I/O bus 1908, and an I/O bus interface unit 1910.

The computer system 1900 may contain one or more general-purpose programmable central processing units (CPUs) 1902A, 1902B, 1902C, and 1902D, herein generically referred to as the CPU 1902. In some embodiments, the computer system 1900 may contain multiple processors typical of a relatively large system; however, in other embodiments the computer system 1900 may alternatively be a single CPU system. Each CPU 1902 may execute instructions stored in the memory subsystem 1904 and may include one or more levels of on-board cache.

System memory 1904 may include computer system readable media in the form of volatile memory, such as random access memory (RAM) 1922 or cache memory 1924. Computer system 1900 may further include other removable/non-removable, volatile/non-volatile computer system storage media. By way of example only, storage system 1926 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1904 can include flash memory, e.g., a flash memory stick drive or a flash drive. Memory devices can be connected to memory bus 1903 by one or more data media interfaces. The memory 1904 may include at least one program product having a set (e.g., at least one) of program modules that are configured to carry out the functions of various embodiments.

One or more programs/utilities 1928, each having at least one set of program modules 1030 may be stored in memory 1904. The programs/utilities 1928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1928 and/or program modules 1930 generally perform the functions or methodologies of various embodiments.

Although the memory bus 1903 is shown in FIG. 19 as a single bus structure providing a direct communication path among the CPUs 1902, the memory subsystem 1904, and the I/O bus interface 1910, the memory bus 1903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1910 and the I/O bus 1908 are shown as single respective units, the computer system 1900 may, in some embodiments, contain multiple I/O bus interface units 1910, multiple I/O buses 1908, or both. Further, while multiple I/O interface units are shown, which separate the I/O bus 1908 from various communications paths running to the various I/O devices, in other embodiments some or all of the I/O devices may be connected directly to one or more system I/O buses.

In some embodiments, the computer system 1900 may be a multi-user mainframe computer system, a single-user system, or a server computer or similar device that has little or no direct user interface, but receives requests from other computer systems (clients). Further, in some embodiments, the computer system 1900 may be implemented as a desktop computer, portable computer, laptop or notebook computer, tablet computer, pocket computer, telephone, smartphone, network switches or routers, or any other appropriate type of electronic device.

It is noted that FIG. 19 is intended to depict the representative major components of an exemplary computer system 1900. In some embodiments, however, individual components may have greater or lesser complexity than as represented in FIG. 19, components other than or in addition to those shown in FIG. 19 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for identifying an anomaly in one or more communications:

monitoring, by a processor, the one or more communications for an utterance;

performing natural language processing (NLP) of the utterance;

generating an understanding of the utterance using natural language understanding (NLU);

obtaining aircraft and engine operating parameters and context information;

identifying a target rule of one or more rules associated with the understanding of the utterance;

comparing a target associated with the target rule to the aircraft and engine operating parameters;

detecting the anomaly based on comparing the target to the one or more aircraft and engine operating parameters and context information; and executing a response, responsive to detecting the anomaly.

2. The method of claim 1, wherein detecting the anomaly from the understanding of the utterance includes:

comparing the utterance against one or more established alert rules.

3. The method of claim 2, wherein one or more alert rules further includes checking at least one scope policy, at least one anomaly policy, and at least one response policy.

4. The method of claim 1, wherein detecting the anomaly further includes:

determining if a timer exceeds a maximum allotted time; and identifying an anomaly has occurred in the utterance.

5. The method of claim 1, wherein detecting the anomaly includes:

determining if a trigger in the utterance has occurred; and determining if the target associated with the trigger has occurred in the utterance.

6. The method of claim 5, further including:

determining a confidence score for the trigger; and determining if the confidence score of the trigger exceeds a minimum threshold.

7. The method of claim 5, further including:

determining a confidence score for the target; and determining if the confidence score of the target exceeds a minimum threshold.

8. The method of claim 1, further comprising:

analyzing the one or more communications;

identifying one or more partial utterances in the one or more communications; and updating a communication register by replacing each of the one or more partial utterances with an associated full utterance.

9. A system for identifying an anomaly in one or more communications, the system comprising:

a memory; and a processor in communication with the memory, the processor being configured to perform operations comprising:

monitoring the one or more communications for an utterance;

performing natural language processing (NLP) of the utterance;

generating an understanding of the utterance using natural language understanding (NLU);

obtaining aircraft and engine operating parameters and context information;

identifying a target rule of one or more rules associated with the understanding of the utterance;

comparing a target associated with the target rule to the aircraft and engine operating parameters;

detecting the anomaly based on comparing the target to the one or more aircraft and engine operating parameters and context information; and executing a response, responsive to detecting the anomaly.

10. The system of claim 9, wherein detecting the anomaly from the understanding of the utterance includes:

comparing the utterance against one or more established alert rules.

11. The system of claim 10, wherein one or more alert rules further includes checking at least one scope policy, at least one anomaly policy, and at least one response policy.

12. The system of claim 9, wherein detecting the anomaly further includes:

determining if a timer exceeds a maximum allotted time; and identifying an anomaly has occurred in the utterance.

13. The system of claim 9, wherein detecting the anomaly includes:

determining if a trigger in the utterance has occurred; and determining if the target associated with the trigger has occurred in the utterance.

14. The system of claim 13, further including:

determining a confidence score for the trigger; and determining if the confidence score of the trigger exceeds a minimum threshold.

15. The system of claim 13, further including:

determining a confidence score for the target; and determining if the confidence score of the target exceeds a minimum threshold.

16. A computer program product for removing an anomaly in a collection of material, the computer program product comprising a computer readable storage medium having program instructions embodied therewith, the program instructions executable by a processor to cause the processors to perform a function, the function comprising:

monitoring the one or more communications for an utterance;

performing natural language processing (NLP) of the utterance;

generating an understanding of the utterance using natural language understanding (NLU);

obtaining aircraft and engine operating parameters and context information;

identifying a target rule of one or more rules associated with the understanding of the utterance;

comparing a target associated with the target rule to the aircraft and engine operating parameters;

detecting the anomaly based on comparing the target to the one or more aircraft and engine operating parameters and context information; and executing a response, responsive to detecting the anomaly.

17. The computer program product of claim 16, wherein detecting the anomaly from the understanding of the utterance includes:

comparing the utterance against one or more established alert rules.

18. The computer program product of claim 16, wherein detecting the anomaly further includes:

determining if a timer exceeds a maximum allotted time; and identifying an anomaly has occurred in the utterance.

19. The computer program product of claim 16, wherein detecting the anomaly includes:

determining if a trigger in the utterance has occurred; and determining if the target associated with the trigger has occurred in the utterance.

20. The computer program product of claim 19, further including:
   determining a confidence score for the trigger; and
   determining if the confidence score of the trigger exceeds a minimum threshold.

\* \* \* \* \*